United States Patent [19]

Furutani

[11] Patent Number: 5,043,913

[45] Date of Patent: Aug. 27, 1991

[54] NEURAL NETWORK

[75] Inventor: Kiyohiro Furutani, Hyogo, Japan

[73] Assignee: Mitsubishi Denki Kabushiki Kaisha, Tokyo, Japan

[21] Appl. No.: 365,461

[22] Filed: Jun. 13, 1989

[30] Foreign Application Priority Data

Jun. 14, 1988 [JP] Japan ............................ 63-147706
Dec. 14, 1988 [JP] Japan ............................ 63-316922

[51] Int. Cl.⁵ .................................................. G06F 15/18
[52] U.S. Cl. ....................................................... 364/513
[58] Field of Search ........................................... 364/513

[56]         References Cited
            PUBLICATIONS

An Introduction to Computing with Neural Nets; Richard P. Lippmann; IEEE ASSP Magazine; Apr. 1987; pp. 4-22.
A Neural Network for Visual Pattern Recognition; K. Fukushima; Computer; Mar.1988; pp. 65-75.
"Simple 'Neural' Optimization Networks: An A/D Converter, Signal Decision Circuit, and a Linear Programming Circuit" by Tank and Hopfield, IEEE Transactions on Circuits and Systems, vol. CAS-33, No. 5, May 1986.
"A CMOS Associative Memory Chip Based on Neural Networks", by Graf and de Vegvar, 1987 IEEE International Solid-State Circuits Conference, 2/27/87.

*Primary Examiner*—Allen R. MacDonald
*Attorney, Agent, or Firm*—Lowe, Price, LeBlanc and Becker

[57]              ABSTRACT

Input signals inputted in respective unit circuits forming a synapse array pass through variable connector elements to be integrated into one analog signal, which in turn is converted into a binary associated corresponding signal by an amplifier. Two control signals are produced on the basis of the associated corresponding signal and an educator signal. The two control signals are fed back to the respective unit circuits, to control degrees of electrical coupling of the variable connector elements in the respective unit circuits. Thus, learning of the respective unit circuits is performed.

16 Claims, 16 Drawing Sheets

FIG.7

$$W = \begin{array}{|c|c|c|c|c|c|c|c|c|}
\hline
0 & 1 & 0 & 1 & 1 & 1 & 0 & 1 & 0 \\
\hline
2 & -2 & -1 & 0 & 1 & -2 & 1 & 0 & 2 \\
\hline
1 & 0 & -1 & 2 & 2 & 0 & 1 & 2 & 1 \\
\hline
2 & 0 & 1 & -2 & 1 & 0 & -1 & -2 & 2 \\
\hline
1 & 0 & 1 & 0 & -2 & 0 & 1 & 0 & 1 \\
\hline
2 & -2 & -1 & 0 & 1 & -2 & 1 & 0 & 2 \\
\hline
1 & 2 & 1 & 0 & 2 & 2 & -1 & 0 & 1 \\
\hline
2 & 0 & 1 & -2 & 1 & 0 & -1 & -2 & 2 \\
\hline
0 & 1 & 0 & 1 & 1 & 1 & 0 & 1 & 0 \\
\hline
\end{array}$$

(a)

(b)

(c)

(d)

FIG.10
| x1 | x2 | y1 |
|----|----|----|
| 0  | 0  | 0  |
| 0  | 1  | 1  |
| 1  | 0  | 1  |
| 1  | 1  | 0  |
FIG.11
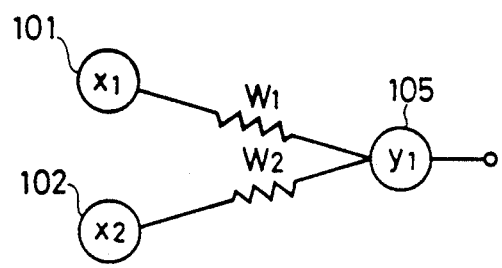
FIG.12
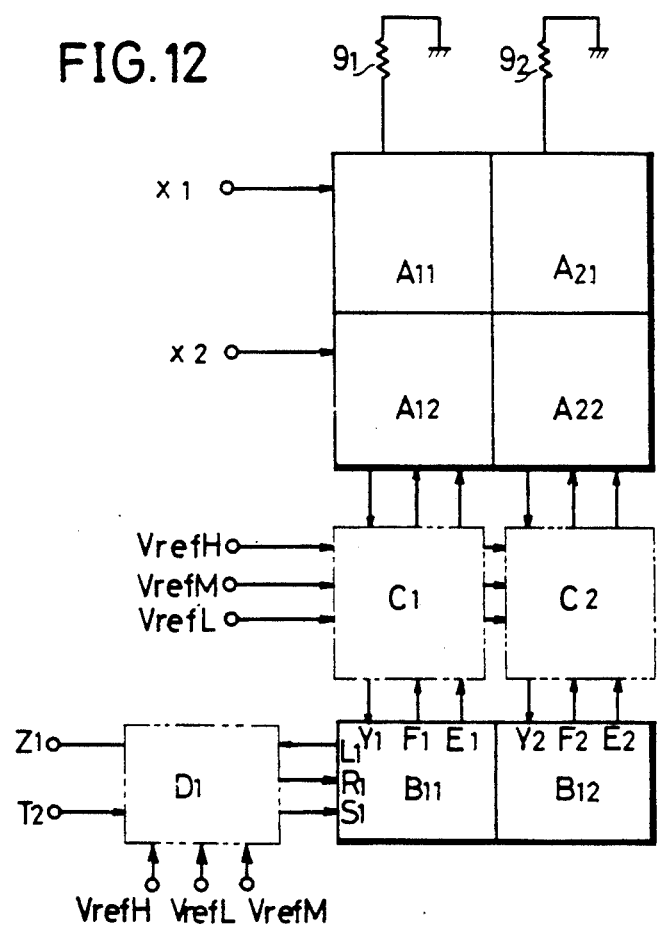

NEURAL NETWORK

BACKGROUND OF THE INVENTION

1. Field of the Invention

The present invention relates to a neural network, and more specifically, it relates to a neural network which artificially simulates nerve cells of an organism by electric circuits.

2. Description of the Prior Art

In recent years, study has been deeply made to apply a neural network to artificially simulate nerve cells of an organism in the field of pattern recognition and artificial intelligence.

FIG. 1 shows nerve cell structure of an organism. Dendrites receive stimuli from axons, of other nerve cells. The magnitudes of stimuli transferred to the dendrites depend on the degrees of coupling of synapses. When the total magnitude of stimulus received by one nerve cell exceeds a predetermined value, this nerve cell is excited and transfers the stimulus to other nerve cells through the axons. In 1958, F. Rosenblatt advocated a perceptron, which implements the function of a pattern discriminator by modelling the nerve cell.

FIG. 2A is a conceptual diagram schematically showing the perceptron. The neural network shown in FIG. 2A simulates a state in which four nerve cells 101 to 104 are connected to a nerve cell 105 through synapses, $w_1$, $w_2$, $w_3$ and $w_4$. Assuming that $x_1$ to $x_4$ represent magnitudes of stimuli output from the nerve cells 101 to 104, the summation of stimulus input to the nerve cell 105 is $$\sum_{i=1}^{4} w_i x_i.$$

As shown in FIG. 2B, output y from the nerve cell 105 is "1" when the input stimulus quantity $$\sum_{i=1}^{4} w_i x_i$$

is greater than a threshold value h, while the same is "0" when the input stimulus quantity $$\sum_{i=1}^{4} w_i x_i$$

is less than the threshold value h.

The perceptron shown in FIG. 2A can program the degrees of coupling of connector elements so that the output y goes to "1" only when $x_1$, $x_2$, $x_3$ and $x_4$ have specific patterns. Thus, the perceptron can be applied to a character reader, for example, which encodes information of read characters into binary numbers. In this case, the degrees of coupling of the connector elements may be programmed so that the output y goes to "1" only when binary codes corresponding to desired characters are input to the perceptron. The feature of such a character reader implemented by the perceptron resides in that it can discriminate read characters even if the characters are incomplete due to blurring or chipping, by allowing for small errors.

The perceptron has two operating modes including a learning mode (see FIG. 2C) of programming values of the connector elements to attain required correspondence between input and output as hereinabove described, and an association mode (see FIG. 2D) of outputting y which corresponds to input x in response to the programmed correspondence.

In contrast to a general computer, there is no need to humanly develop an algorithm for pattern discrimination and input a program in a calculator in the learning mode. The input signal x and a desirable output signal t (educator signal) corresponding thereto may be inputted in the perceptron, so that the perceptron itself automatically changes the values of the connector elements so that the output y coincides with the educator signal t. This is apparently similar to learning of the brain of a human, and hence called a learning mode.

It is known that a synapse value $w_i$ may be changed to reduce the square error $E = \frac{1}{2}(y-t)^2$ of the output y and the expected value t** in order to make the learning of the neural network shown in FIG. 2A such that the output y from the nerve cell 105 goes to an expected value t when the nerve cell 101 to 104 output $x_1$, $x_2$, $x_3$ and $x_4$, for example, in this learning mode. When the synapse value $w_i$ is changed to $w_i + \Delta w_i$, the square error E is converted to $$E(w_i + \Delta w_i) = E(w_i) + \Delta w_i \frac{\partial E}{\partial w_i}.$$

Therefore, assuming that $$\Delta w_i = -\epsilon \frac{\partial E}{\partial w_i}.$$

where E represents a positive constant $$E(w_i + \Delta w_i) - E(w_i) = -\epsilon \left( \frac{\partial E}{\partial w_i} \right)^2 < 0,$$

and hence the square error E is reduced. Thus a process of changing the synapse value $w_i$ to:

$$w_i - \epsilon \frac{\partial E}{\partial w_i} = w_i - \epsilon' x_i(t - y) \qquad (1)$$

where $E' = E\ f'$ and $$y = f\left( \sum_i w_i x_i \right).$$

may be repeated. The expression (1) is known as the learning rule of the perceptron. The method of changing x in accordance with $$x - \epsilon \frac{\partial f}{\partial x}$$

for reducing the function f with variable x is known as the steepest descent method.

In general, such a perceptron function has been implemented by software processing of a computer. Therefore, a computer has been generally required in order to use the perceptron, and hence the system has been complicated. Thus, there has been a demand to implement the perceptron technique by a simple hardware circuit.

Japanese Patent Laying-Open Gazette No. 81755/1984 discloses implementing functions of nerve cells and simulation of a learning operation through a technique different from the perceptron technique. FIG. 3 shows a simulation circuit disclosed in the said Gazette. Referring to FIG. 3, an artificial neuron has a plurality of external input terminals 202, which are connected with input lines $I_1, I_2, \ldots, I_N$ from an external stimulus source such as another neuron or a sensor. The external input terminals 202 are connected with synapses $S_1, S_2, \ldots, S_N$ respectively. Symbol + or − indicates whether the corresponding synapse is stimulative (+) or inhibitory (−).

When an input signal is received on one of the input lines from the external stimulus source, a corresponding synapse carries a four-bit number expressing its potential (hereinafter referred to as "synapse value") on a data bus 204 which is connected between the synapse and an output generator 205. if the synapse is stimulative, the synapse value is positive and is added to a time-changing value stored in the output generator 205. If the synapse is inhibitory, on the other hand, the synapse value is subtracted from the value stored in the generator. If the synapse value is positive and the value in the generator thereby exceeds a predetermined threshold value, the output generator 205 outputs pulses outputted from one or more neurons to an output line 206. The output pulses from the neurons may be employed to control a driver (in a step motor, for example). Alternatively, these pulses may be supplied to synapses of another neuron as input signals, to be further integrated. The output pulses are fed back to the respective synapses of the original neuron through a line 207, to control change in the synapse values. The simulation circuit shown in FIG. 3 further has two input terminals 208 and 209, which are shown as positive and negative fixers.

Assuming that an input signal is received in the synapse $S_2$, which is stimulative, for example, from the external stimulus source and thereafter the output generator 205 derives an output signal, reduction of the synapse value is started from the time of generation of the output signal. Input in the output generator 205 is also changed in response to the synapse value, while a positive fixer signal is generated when the output from the output generator 205 reaches a desired value and input in the input terminal 208, thereby to fix the value of the synapse $S_2$.

This learning operation, i.e., the process of correcting the synapse value, is adapted to count down the synapse value from the initial value and fix the same when the output from the output generator 205 reaches the desirable value, by exhaustively scanning the synapse value and optimizing the same. Thus, this method is inferior in learning efficiency. On the other hand, the aforementioned perceptron technique of optimizing the synapse value by the steepest descent method is considered to be superior in learning efficiency to the simulation circuit shown in FIG. 3. This is because the steepest descent method is adapted to determine whether the output is greater or less than the desired value on the basis of a judgement as to whether a partial differential coefficient of the square error is positive or negative thereby to reduce the synapse value when the output is greater than the desired value while increasing the synapse value when the output is less than the desired value, and hence the synapse value converges to the optimum value at a speed higher than that in the circuit shown in FIG. 3.

As hereinabove described, the conventional perceptron requires a computer for implementation thereof, and hence the system is complicated. On the other hand, the conventional hardware simulation circuit shown in FIG. 3 is inferior in learning efficiency, although it requires no computer.

SUMMARY OF THE INVENTION

An object of the present invention is to provide a neural network, which can implement functions of nerve cells of an organism and learning operation with only hardware circuits, and which is excellent in learning efficiency.

Briefly stated, a plurality of logic signals inputted from a plurality of signal input terminals are integrated into one analog signal through a plurality of synapse circuits so that the integrated analog signal is level-discriminated at prescribed threshold voltage to be converted into a binary associated corresponding signal, and a control signal is generated on the basis of the associated corresponding signal and an educator signal thereby to control increase, decrease or maintain degrees of electrical coupling of the respective synapse circuits on the basis of the control signal.

In another aspect of the present invention, a pair of neural circuits are so provided that the first neural circuit receives logic signals inputted from a plurality of signal input terminals and outputs a plurality of intermediate stage signals and the second neural circuit receives the plurality of intermediate stage signals outputted from the first neural circuit and outputs at least one associated corresponding signal. Further provided are first learning means for the first neural circuit and second learning means for the second neural circuit.

According to the present invention, the perceptron learning technique of the respective synapse circuits by the so-called steepest descent method is implemented by hardware circuits. Thus, a neural network having excellent learning efficiency can be obtained while employing no computer. As the result, a neural network system can be simplified in structure.

According to the present invention, further, a neural network of two-layer structure can be implemented by hardware circuits.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates exemplary convergence values of degrees of coupling of respective variable connector elements in simulation performed by expanding the embodiment shown in FIG. 4A to nine rows and nine columns;

FIG. 10 illustrates logical relation between inputs and an output of the so-called exclusive OR circuit;

FIG. 11 typically illustrates an example of a one-layer perceptron;

FIG. 12 illustrates an exclusive OR circuit formed by a two-layer neural network according to an embodiment of the present invention;

DESCRIPTION OF THE PREFERRED EMBODIMENTS

Figure 1:
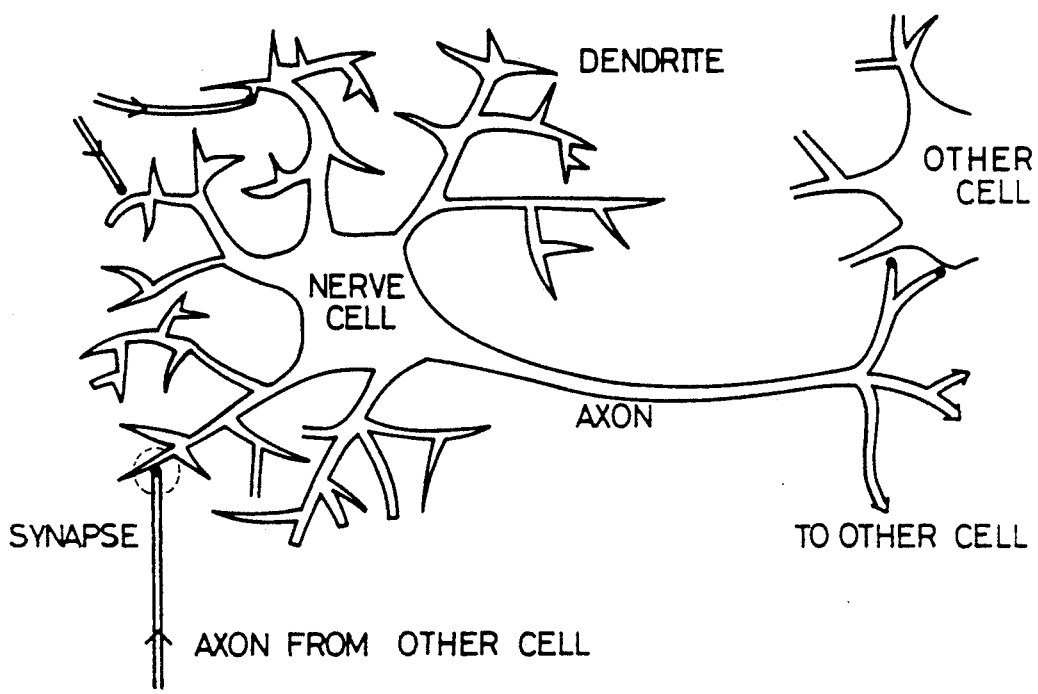
FIG. 1 illustrates nerve cell structure of an organism.
Figure 2C:
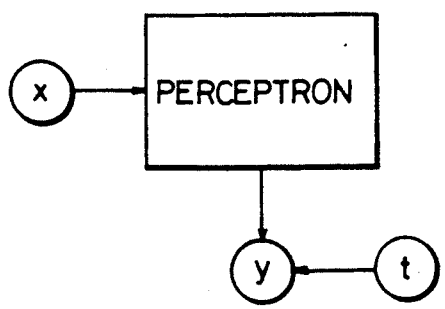
FIGS. 2C and 2D are diagrams for illustrating operating modes of the perceptron.
Figure 2D:
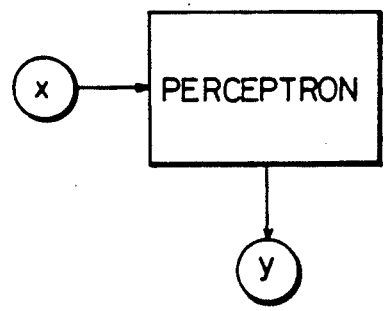
Figure 2A:
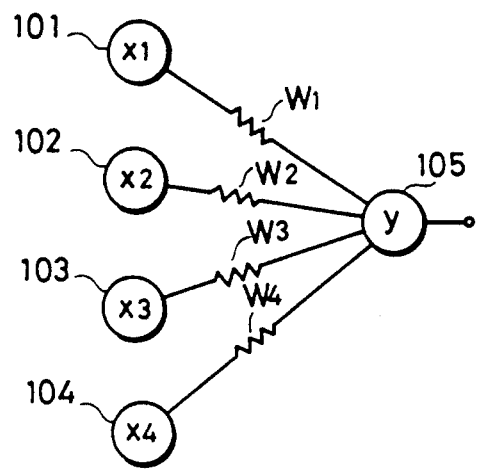
FIG. 2A typically illustrates the concept of a conventional perceptron.
Figure 2B:
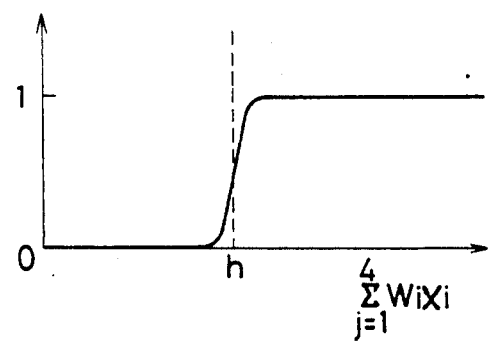
FIG. 2B is a graph showing the output characteristic of a nerve cell 105 shown in FIG. 2A.
Figure 3:
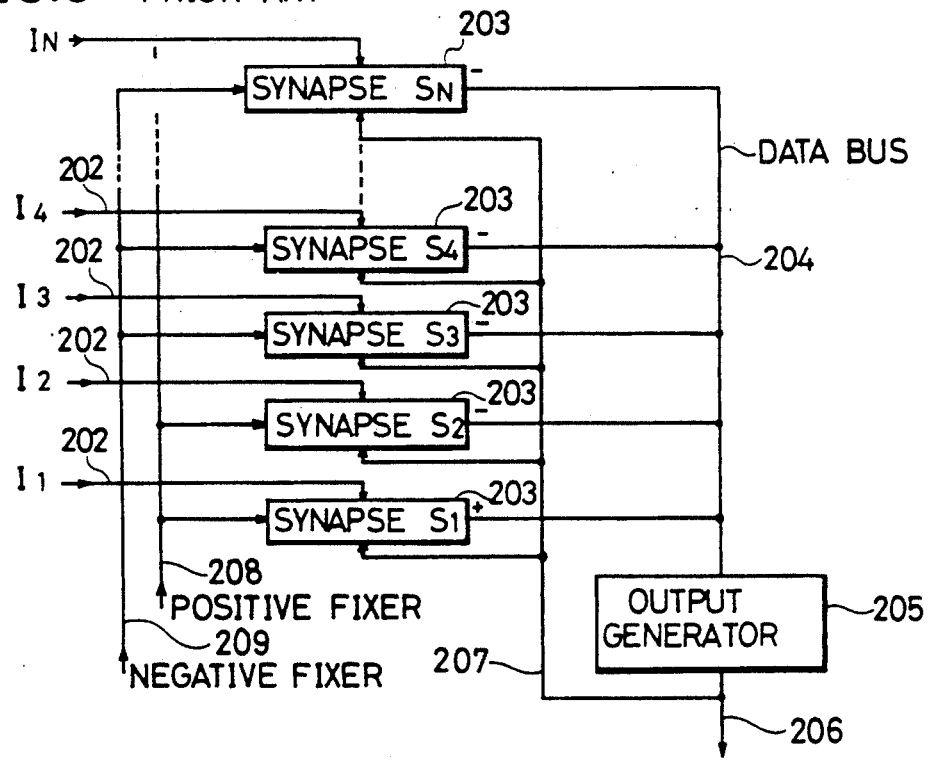
FIG. 3 is a block diagram showing a conventional hardware circuit implementing functions of nerve cells and simulation of learning operation through a technique different from the perceptron technique.
Figure 4A:
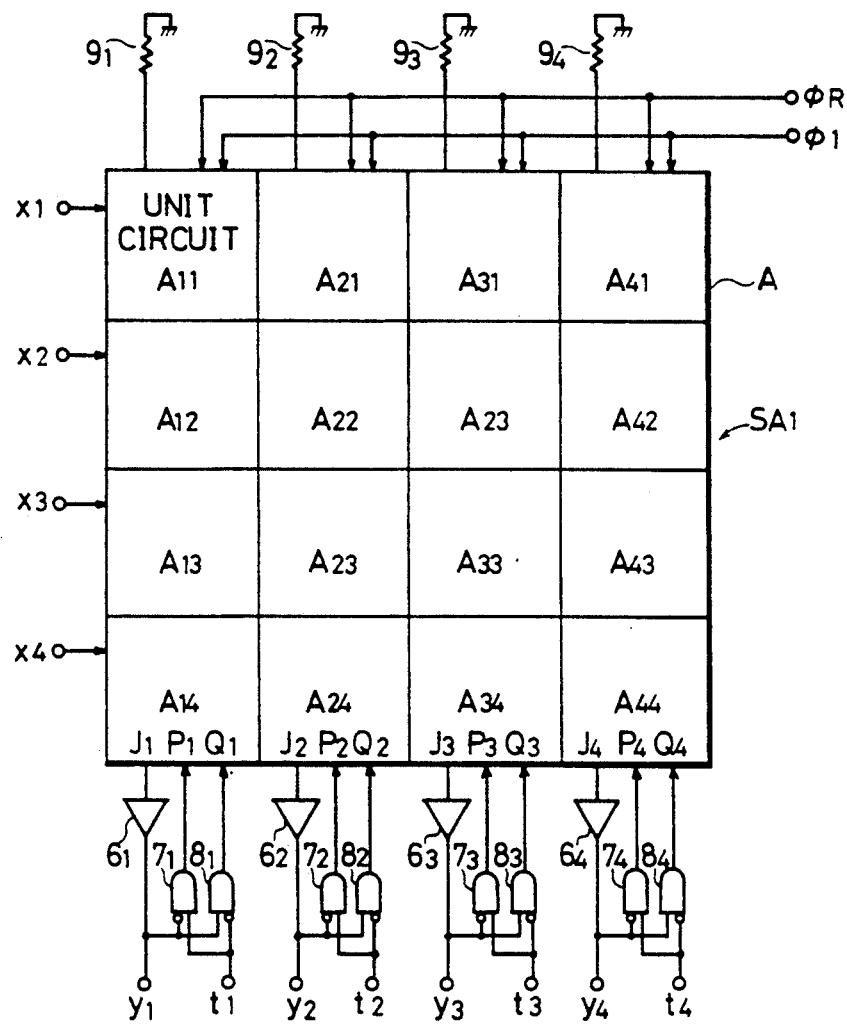
FIG. 4A illustrates the structure of a first embodiment of the present invention.

FIG. 4A illustrates the structure of a neural network according to an embodiment of the present invention. The neural network shown in FIG. 4A implements a perceptron which outputs an associated corresponding signal $y_i$ ($i=1, 2, 3, 4$) with respect to an input signal $x_j$ ($j=1, 2, 3, 4$) in hardware. Referring to FIG. 4A, this embodiment comprises a synapse array SA1, which is formed by a plurality of unit circuits $A_{11}$ to $A_{44}$ arranged in the form of a matrix. The synapse array SA1 shown in FIG. 4A is formed with four rows and four columns, while the numbers of such rows and columns may be arbitrarily selected by design.

Figure 4B:
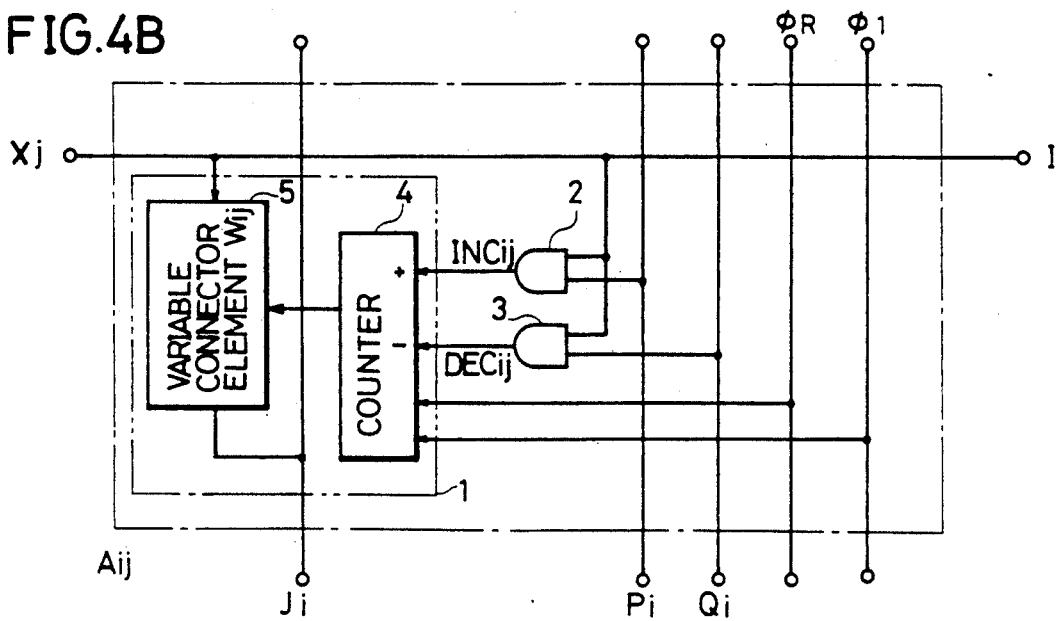
FIG. 4B illustrates the structure of a unit circuit shown in FIG. 4A.

Each unit circuit $A_{ij}$ has structure shown in FIG. 4B. The unit circuit $A_{ij}$ (corresponding to input $x_j$ and output $y_i$) comprises a synapse circuit 1 and AND gates 2 and 3. The synapse circuit 1 is formed by a counter circuit 4 and a variable connector element 5.

The neural network shown in FIG. 4A further comprises amplifiers $6_1$ to $6_4$, AND gates $7_1$ to $7_4$ and $8_1$ to $8_4$ and resistors $9_1$ to $9_4$ in correspondence to respective columns of the synapse array SA1. The amplifiers $6_1$ to $6_4$ receive signals $j_1$ to $j_4$ from the corresponding columns of the synapse array SA1 respectively, and output the signals $y_1$ to $y_4$. Each of the signals $y_1$ to $y_4$ is a binary signal of "1" or "0". Externally inputted educator signals $t_1$ to $t_4$ are supplied to first input ends of the AND gates $7_1$ to $7_4$ respectively. Each of the educator signals $t_1$ to $t_4$, indicating expected values, is a binary signal of "1" or "0". Inverted signals of the signals $y_1$ to $y_4$ are supplied to second input ends of the AND gates $7_1$ to $7_4$ respectively. Inverted signals of the educator signals $t_1$ to $t_4$ are supplied to first input ends of the AND gates $8_1$ to $8_4$ respectively. The signals $y_1$ to $y_4$ are supplied to second input ends of the AND gates $8_1$ to $8_4$ respectively. Outputs from the AND gates $7_1$ to $7_4$ and those from the AND gates $8_1$ to $8_4$ are supplied to the unit circuits in the corresponding columns of the synapse array SA1 as signals $P_1$ to $P_4$ and $Q_1$ to $Q_4$ respectively.

Figure 5:
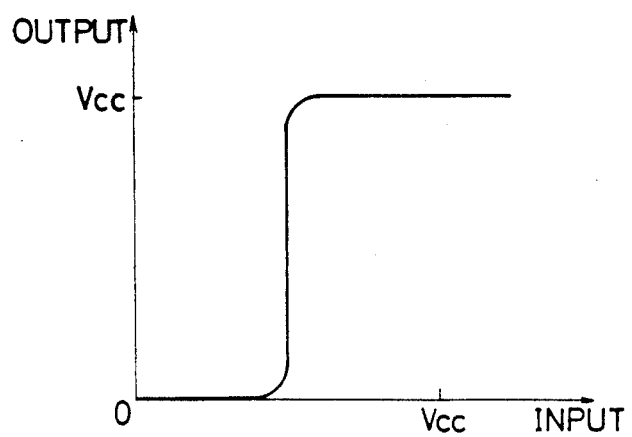
FIG. 5 is a graph showing transfer functions of amplifiers $6_1$ to $6_4$ shown in FIG. 4A.

The operation of the embodiment shown in FIGS. 4A and 4B is now described. First, learning operation is made by inputting the input signals $x_1$ to $x_4$ and the educator signals $t_1$ to $t_4$. The input signals $x_1$ to $x_4$ are supplied to the unit circuits in corresponding rows respectively, and the educator signals $t_1$ to $t_4$ are supplied to the unit circuits in the corresponding columns. Assuming that an input signal $x_j$ is supplied, an output signal $y_i$ is:

$$y_i = f\left(\sum_{j=1}^{4} w_{ij} x_j\right)$$

where f represents transfer functions of the amplifiers $6_1$ to $6_4$, having characteristics shown in FIG. 5. Symbol $w_{ij}$ denotes the degree of coupling of the variable connector element 5 in the unit circuit $A_{ij}$.

Output $P_i$ of an AND gate $7_i$, which is the logical product of an inverted signal of the output signal $y_i$ and an educator signal $t_i$, goes high only when $y_i$ is low and $t_i$ is high. Output $Q_i$ of an AND gate $8_i$, which is the logical product of the output signal $y_i$ and an inverted signal of the educator signal $t_i$, goes high only when $y_i$ is high and $t_i$ is low. Output $INC_{ij}$ of the AND gate 2, which is the logical product of the input signal $x_j$ and the signal $P_i$, goes high only when $x_j$ is high and $P_i$ is high. Output $DEC_{ij}$ of the AND gate 3, which is the logical product of the input signal $x_j$ and the signal $Q_i$, goes high only when $x_j$ is high and $Q_i$ is high. The degree $w_{ij}$ of coupling of the variable connector element 5 is increased when the signal $INC_{ij}$ is high, and decreased when the signal $DEC_{ij}$ is high.

Before the learning operation, a reset signal $\phi_R$ clears the value at the counter circuit 4. Then, a clock signal $\phi_1$ goes high, whereby the value at the counter circuit 4 is incremented when $INC_{ij}$ is high, while the said value is decremented when $DEC_{ij}$ is high. The degree $w_{ij}$ of coupling of the variable connector element 5 is changed in response to output from the counter circuit 4. Thus, single learning operation is completed.

The aforementioned procedure is repeated to advance learning. This learning operation simulates that of a perceptron for changing the degree $w_{ij}$ of synapse coupling between the input $x_j$ and the output $y_i$ to $w_{ij} + E \cdot x_j$ (ti=$y_i$) through the educator signal $t_i$ by the steepest descent method. Hence, the degree $w_{ij}$ of coupling converges at a high speed, to enable efficient learning.

Associative operation for associating a constant pattern from an input pattern and outputting the same is now described. When the input signal $x_j$ is received, the output $y_i$ goes to $$f\left(\sum_{j=1}^{4} w_{ij} x_j\right).$$

as hereinabove described. This output signal $y_i$ associative output with respect to the input signal $x_j$, i.e., an associated corresponding signal.

Figure 6C:
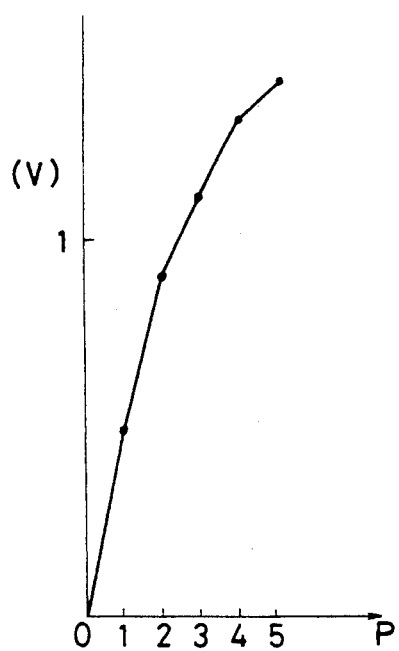
FIG. 6C is a graph showing p-dependency of the potential at a signal line $J_1$ assuming that the positive potential $+V$ is 5 V and the number c of transistors connected to the ground potential is zero, where p represents the number of transistors connected to the positive potential.
Figure 6A:
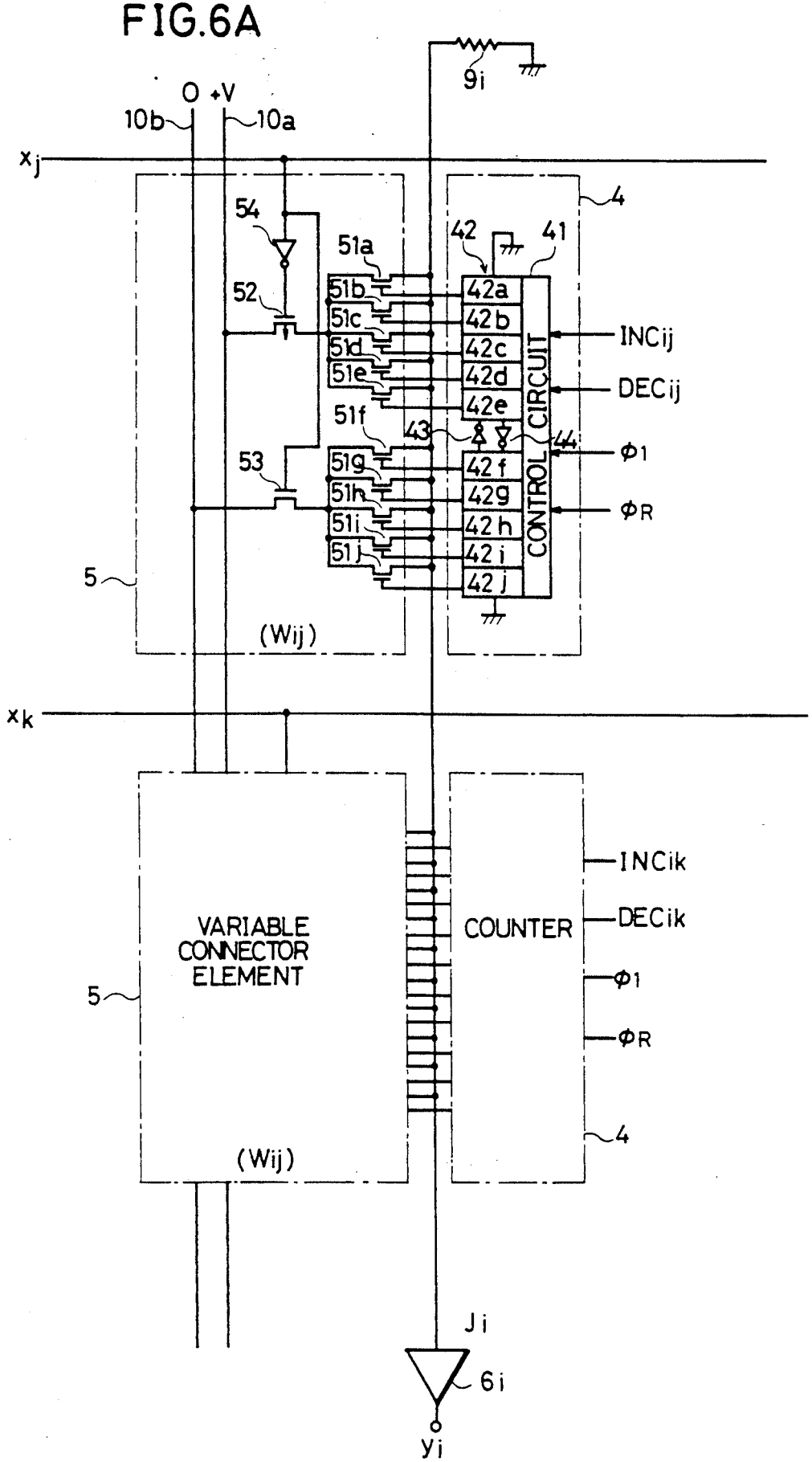
FIG. 6A is a circuit diagram showing the structure of a variable connector element 5 and a counter circuit 4 forming the synapse circuit 1 shown in FIG. 4B in detail.

FIG. 6A is a circuit diagram showing the structure of the variable connector element 5 and the counter circuit 4 forming the synapse circuit 1 shown in FIG. 4B in detail. As shown in FIG. 6A, the counter circuit 4 is formed by a control circuit 41 and a shift register 42. The shift register 42 includes a plurality of unit registers 42a to 42j. The unit registers 42a to 42j are divided into two equal groups, so that the first group (unit registers 42a to 42e) and the second group (unit registers 42f to 42j) are connected with each other by two inverters 43 and 44. The inverter 43 inverts data shifted from the unit register 42f to the unit register 42e. The inverter 44 inverts data shifted from the unit register 42e to the unit register 42f. Both of input terminals of the most and least significant unit registers 42a and 42j are grounded. The control circuit 41 controls the operation of the shift register 42. That is, the control circuit 41 clears contents held in all of the unit registers 42a to 42j in response to the reset signal $\phi_R$. Further, the control circuit 41 controls the data shift direction in the shift register 42 in response to values of the signals $INC_{ij}$ and $DEC_{ij}$. That is, the control circuit 41 upwardly shifts the data in FIG. 6A when $INC_{ij}=1$, and downwardly shifts the data in FIG. 6A when $DEC_{ij}=1$. The initial value of the shift register 42 may not be zero, although the same is normally set at zero. Further, a value other than zero may be required according to circumstances.

On the other hand, the variable connector element 5 comprises transistors 51a to 51j, which are provided in correspondence to the aforementioned unit registers 42a to 42j. Gates of the respective transistors 51a to 51j receive hold data outputs from the unit registers 42a to 42j respectively. Drains of the transistors 51a to 51e are commonly connected to a power supply line 10a through a P-channel transistor 52. Positive voltage +V is applied to the power supply line 10a. Drains of the transistors 51f to 51j are commonly connected to a grounding conductor 10b through an N-channel transistor 53. An inverter 54 supplies the inverted signal of the input signal $x_j$ to the gate of the transistor 52. The input signal $x_j$ is supplied to the gate of the transistor 53. Sources of the transistors 51a to 51j are commonly connected to a corresponding amplifier $6_i$ and a loading resistor $9_i$.

The operation of the circuit shown in FIG. 6A is now described. Assuming that the signal $INC_{ij}$ goes high when the values of the respective unit registers 42a, 42b, . . . , 42j of the shift register 42 are (0000000000), for example, output "1" of the inverter 43 is shifted in the unit register 42e and ground potential "0" is shifted in the unit register 42j, whereby the values go to (0000100000). When the signal $INC_{ij}$ goes high, the values go to (0001100000). Then, when the signal $DEC_{ij}$ goes high, the ground potential "0" is shifted in the unit register 42a and output "0" of the inverter 44 is shifted in the unit register 42f, whereby the values go to (0000100000). Assuming that the signal $DEC_{ij}$ goes high when the value of the shift register 42 is (0000000000), for example, output "1" of the inverter 44 is shifted in the unit register 42f and the ground potential "0" is shifted in the unit register 42a respectively, whereby the value goes to (0000010000). When the signal $DEC_{ij}$ goes high, the value goes to (0000011000). Then, when the signal $INC_{ij}$ goes high, output "0" of the inverter 43 is shifted in the unit register 42e and the ground potential is shifted in the unit register 42j respectively, whereby the value goes to (0000010000).

Thus, when the status of the shift register 42 controlled by the signals $INC_{ij}$ and $DEC_{ij}$ is (0001100000), for example, the positive voltage +V is connected to the amplifier $6_i$ through the transistors 51d and 51e, and this is stimulative synapse coupling having a degree +2 of coupling. When the status of the shift register 42 is (0000011000), for example, the ground potential 0 V is connected to the amplifier $6_i$ through the transistors 51f and 51g, and this is inhibitory synapse coupling having a degree −2 of coupling. The status of the shift register 42 may be in another value, as a matter of course.

As hereinabove described, a synapse element, which can be changed to both of stimulative coupling and inhibitory coupling, can be implemented by the structure shown in FIG. 6A.

Figure 6B:
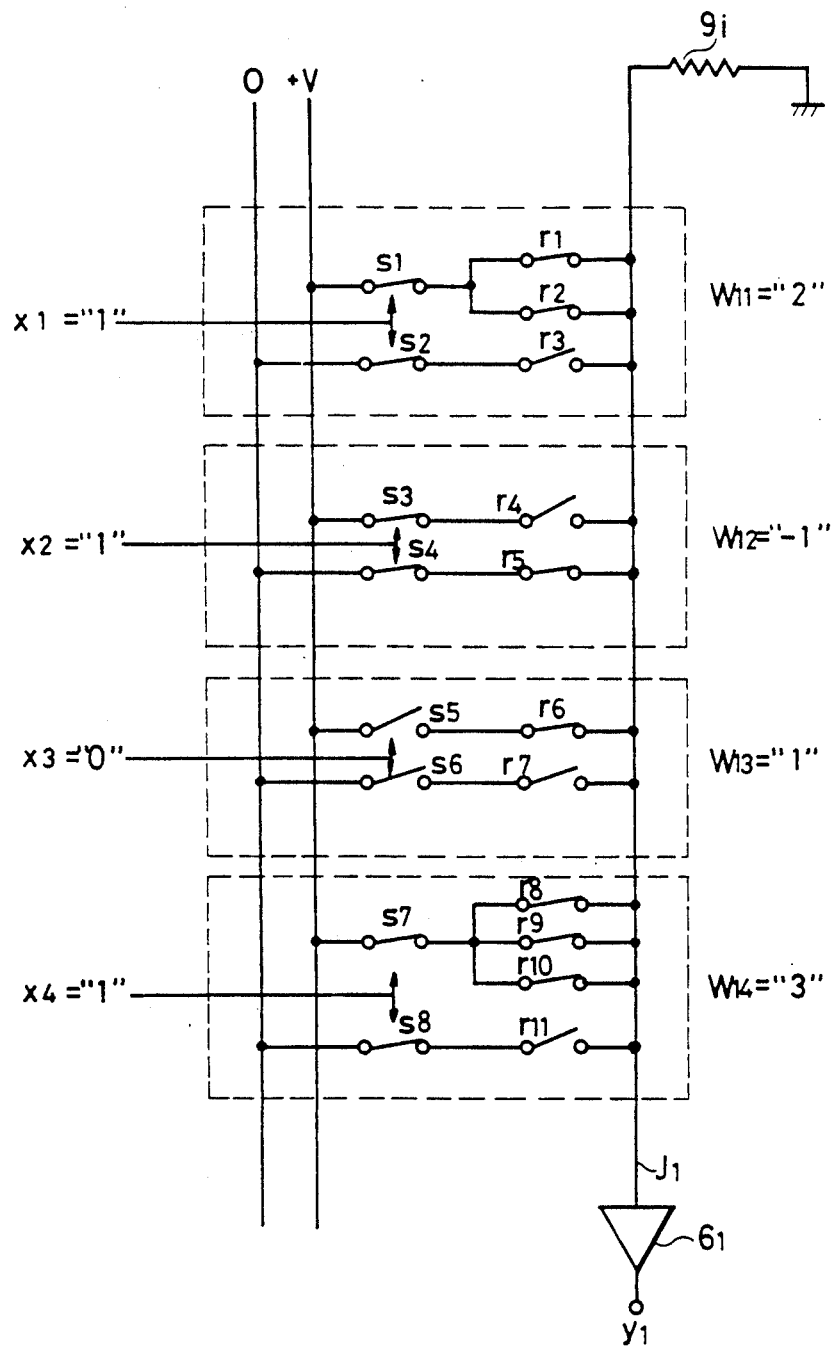
FIG. 6B is an equivalent circuit diagram showing an exemplary coupling state of synapse connector elements in the unit circuits $A_{11}$, $A_{12}$, $A_{13}$ and $A_{14}$ shown in FIG. 4A.

FIG. 6B is an equivalent circuit diagram showing an exemplary coupling state of synapse connector elements in the unit circuits $A_{11}$, $A_{12}$, $A_{13}$ and $A_{14}$ shown in FIG. 4A. Switches $r_1$ to $r_{11}$ correspond to the transistors 51a to 51j shown in FIG. 6A. Switches S1 to S8 correspond to the transistors 52 and 53 shown in FIG. 6A. ON resistance of the transistors 51a to 51j is negligibly small as compared with that of the transistors 52 and 53. In the coupling state shown in FIG. 6B, $(w_{11}, w_{12}, w_{13}, w_{14})=(2, -1, 1, 3)$ and $(x_1, x_2, x_3, x_4)=(1, 1, 0, 1)$.

In this case, current is introduced into a signal line $J_1$ from the positive potential +V through six transistors, and flows out to the ground potential 0 through one transistor. The potential at the signal line $J_1$ is determined by the total number p of the transistors connected to the positive potential +V and the total number q of those connected to the ground potential 0.

When the value of $\Sigma w_i x_i = p - q$ is negative or zero, the potential at the signal line $J_1$ is small. When the value of $\Sigma w_i x_i = p - q$ is positive, on the other hand, the potential at the signal line $J_1$ is raised up as the said value is increased, and if the value of $\Sigma w_i x_i = p - q$ is in excess of a constant value, the output $y_1$ goes to "1" while exceeding the threshold value of the amplifier $6_1$. FIG. 6C shows p-dependency of the potential at the signal line $J_1$ in the case of q=0, assuming that the positive potential +V is 5 V. The resistance of the loading resistor $9_i$ is selected to be $\frac{1}{8}$ of ON resistance of each of the transistors 51a to 51j, which have the same ON resistance values. In this case, the output $y_1$ goes to "1" when $\Sigma w_i x_i = p - q > 2$.

The dynamic range of each variable connector element, which is ±5 in FIG. 6A, can be further widened in order to grade up the neural network.

Simulation for learning was made by expanding the synapse array SA1 shown in FIG. 4A to nine rows and nine columns while assuming that +V in FIG. 6A was 5 V, ON resistance of the transistors $51a$ to $51j$ in FIG. 6A was three times that of the resistor $9_i$ in FIG. 6A, the threshold value of the amplifier $6_i$ was 0.8 V and the initial value of each unit circuit was zero, to associate:

$y_1$ to $y_9$ = (010111010) with input $x_1$ to $x_9$ = (101000101);

$y_1$ to $y_9$ = (100100111) with input $x_1$ to $x_9$ = (011011000);

$y_1$ to $y_9$ = (111001001) with input $x_1$ to $x_9$ = (000110110); and $y_1$ to $y_9$ = (100010001) with input $x_1$ to $x_9$ = (011101110)

whereby counter values of the respective unit circuits converged to values shown in FIG. 7, to complete learning. The resistance value of the resistor $9_i$ is only related to the number of stages of the shift register 42, and irrelevant to extension of the matrix.

Figure 8A:
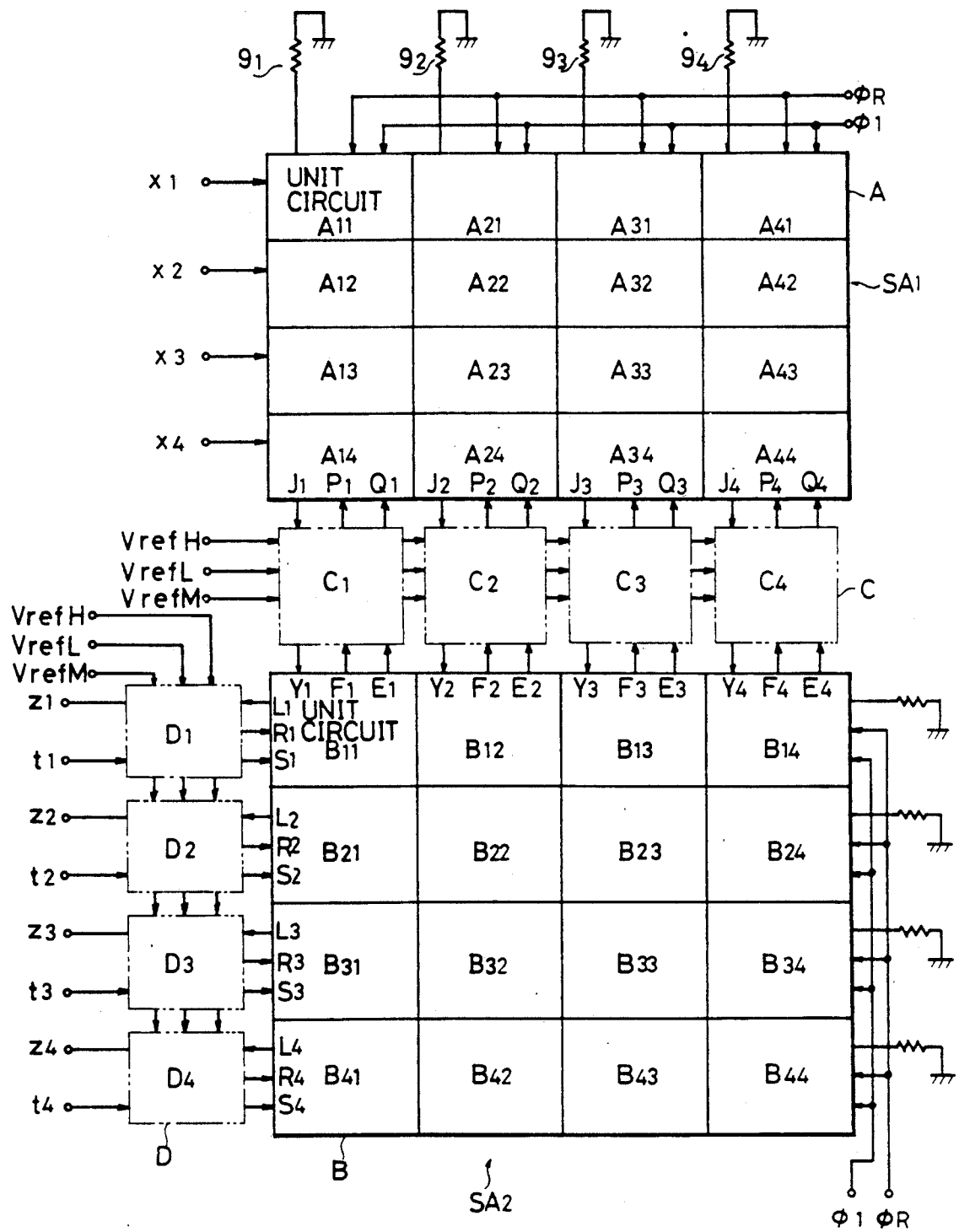
FIG. 8A is a block diagram showing the structure of a second embodiment of the present invention.
Figure 8B:
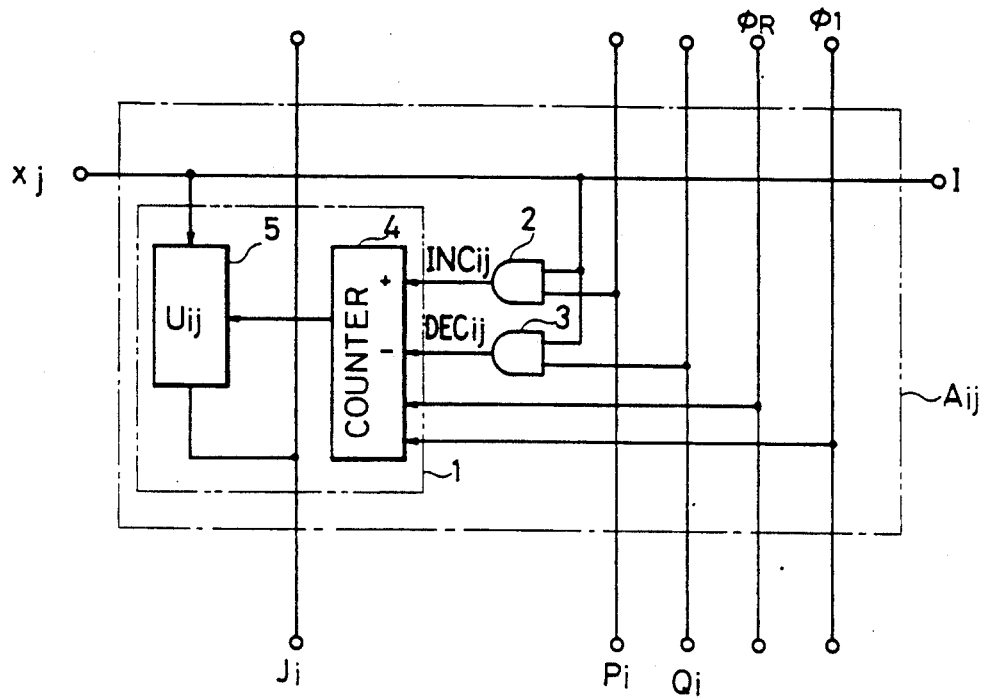
FIG. 8B illustrates the structure of a unit circuit A shown in FIG. 8A.
Figure 8C:
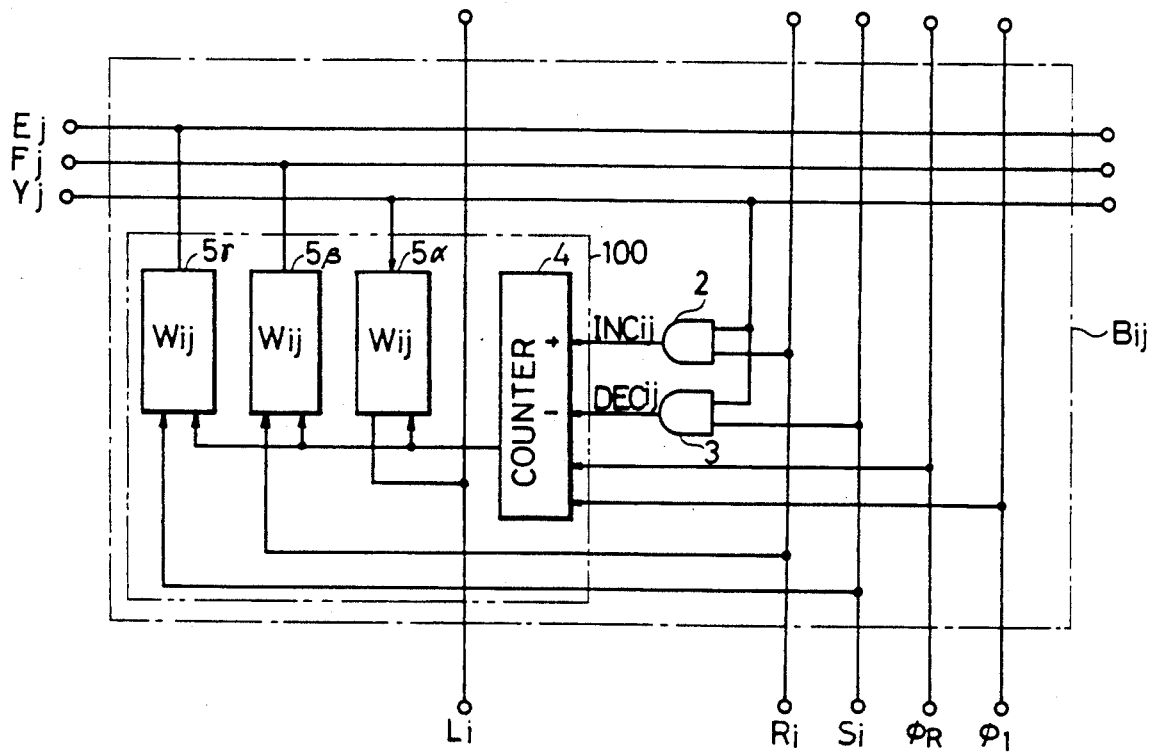
FIG. 8C illustrates the structure of another unit circuit B shown in FIG. 8A.

FIG. 8A is a block diagram showing the structure of a second embodiment of the present invention. The second embodiment implements a perceptron of two-layer structure for outputting an associated corresponding signal $z_i$ (i=1, 2, 3, 4) with respect to an input signal $x_j$ (j=1, 2, 3, 4) in hardware. A technique for obtaining recall output by combining a plurality of perceptrons is generally called a back propagation method. Referring to FIG. 8A, a first-layer perceptron provided on an input side comprises a first synapse array SA1 which is formed by a plurality of unit circuits $A_{11}$ to $A_{44}$ arranged in the form of a matrix and a plurality of intermediate stage circuits $C_1$ to $C_4$ provided for the respective columns of the unit circuits. The first-layer perceptron outputs associated corresponding signals $Y_1$ to $Y_4$ of intermediate stages with respect to input signals $x_1$ to $x_4$. As shown in FIG. 8B, each unit circuit A is identical in structure to that shown in FIG. 4B. A second-layer perceptron provided on an output side comprises a second synapse array SA2 which is formed by a plurality of unit circuits $B_{11}$ to $B_{44}$ arranged in the form of a matrix and a plurality of output stage circuits $D_1$ to $D_4$ provided for the respective rows of the unit circuits. The second-layer perceptron receives the associated corresponding signals $Y_1$ to $Y_4$ of the intermediate stages, and outputs associated corresponding signals $z_1$ to $z_4$ of final stages. As shown in FIG. 8C, a synapse circuit 100 in each unit circuit B is slightly different in structure from a synapse circuit 1 provided in the unit circuit A. The synapse circuit 100 comprises three variable connector elements $5\alpha$, $5\beta$ and $5\gamma$, the degrees of coupling of which are varied with output from a counter circuit 4. The variable connector element $5\alpha$ is employed for forming an associated corresponding signal, and the variable connector elements $5\beta$ and $5\gamma$ are employed for producing an educator signal to be inputted in the first-layer perceptron.

Figure 8D:
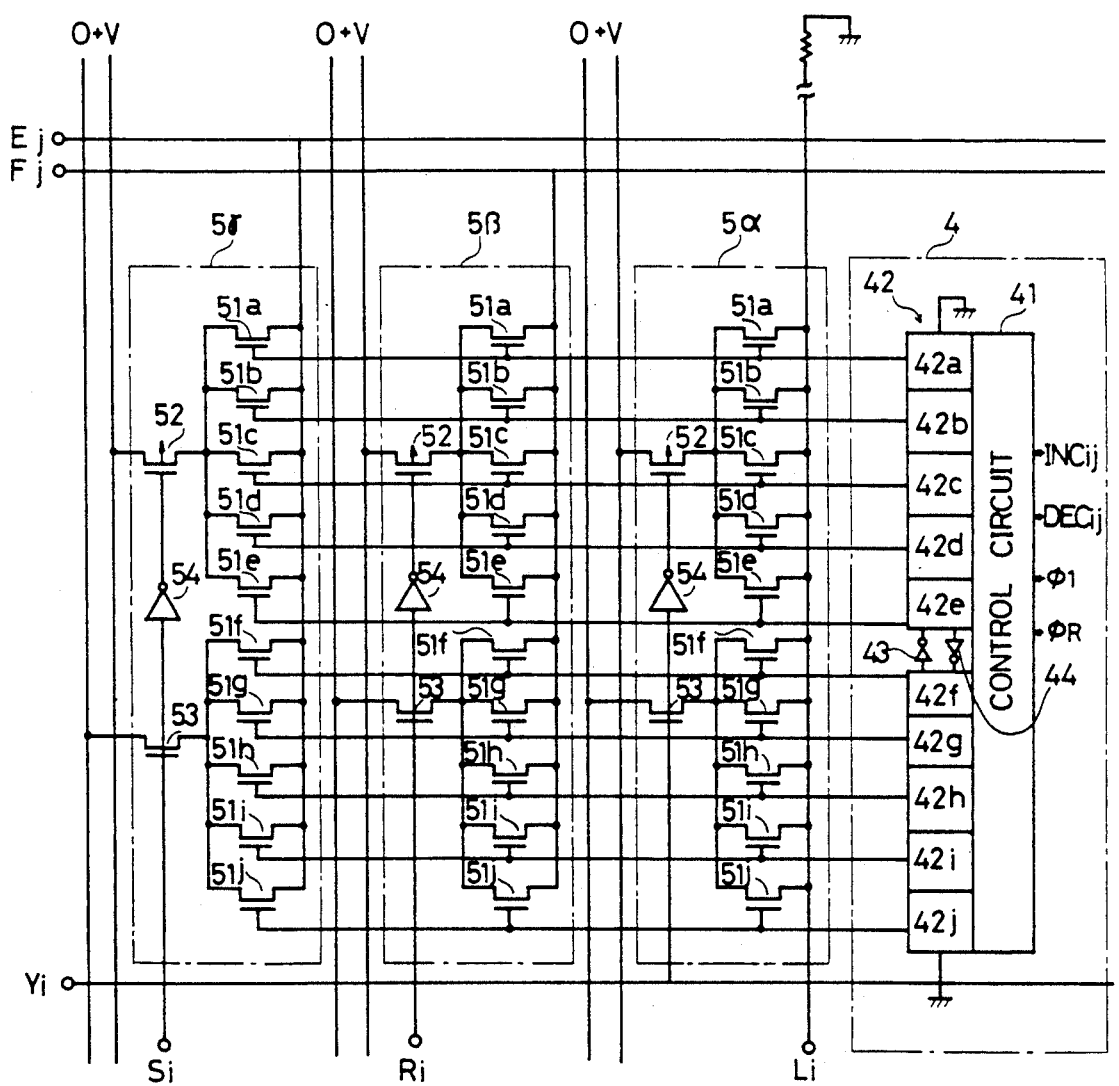
FIG. 8D is a circuit diagram showing a synapse circuit 100 in FIG. 8C in further detail.

FIG. 8D is a circuit diagram showing the structure of the synapse circuit 100 in further detail. As shown in FIG. 8D, the counter circuit 4 is identical in structure to that shown in FIG. 6A. Further, the variable connector elements $5\alpha$, $5\beta$ and $5\gamma$ are also identical in structure to the variable connector element 5 shown in FIG. 6A. The degree of coupling of the variable connector element $5\alpha$ is derived as a signal $L_i$ when a signal $Y_j$ is high. The degree of coupling of the variable connector element $5\beta$ is derived as a signal $F_j$ when a signal $R_i$ is high. The degree of coupling of the variable connector element $5\gamma$ is derived as a signal $E_j$ when a signal $S_i$ is high.

Figure 8E:
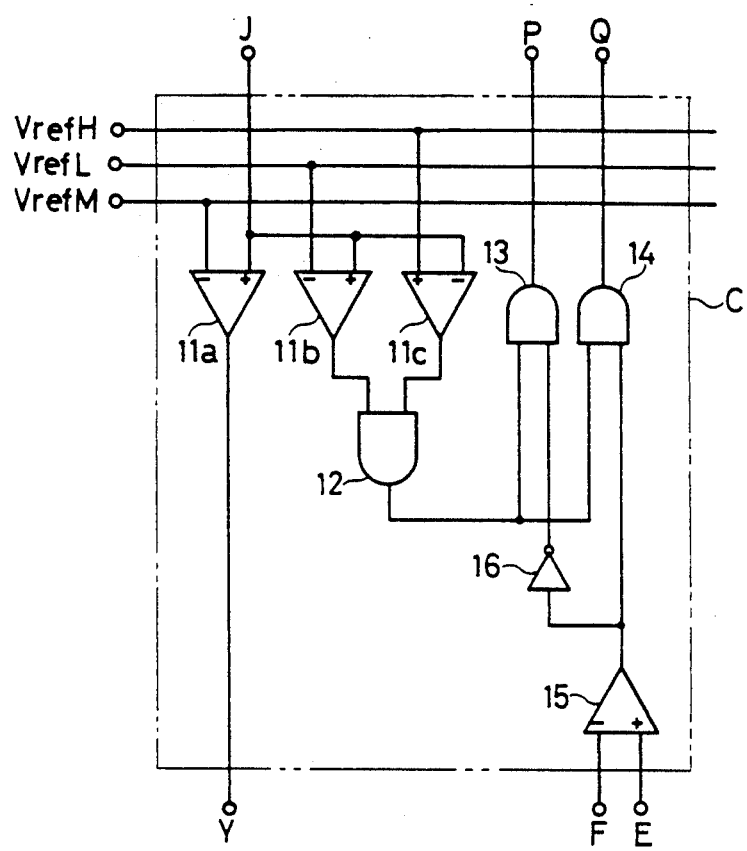
FIG. 8E illustrates the structure of an intermediate stage circuit C shown in FIG. 8A.

FIG. 8E illustrates the structure of each intermediate stage circuit C. The intermediate stage circuits $C_1$ to $C_4$ shown in FIG. 8A are identical in structure to the intermediate stage circuit C shown in FIG. 8E. This intermediate stage circuit C has a function of producing an intermediate stage associated corresponding signal Y ($Y_1$, $Y_2$, $Y_3$ or $Y_4$) on the basis of a signal J ($J_1$, $J_2$, $J_3$ or $J_4$) outputted from a corresponding column of the first synapse array SA1 and supplying the same to a corresponding column of the synapse array SA2, and a function of producing signals P ($P_1$, $P_2$, $P_3$ or $P_4$) and Q ($Q_1$, $Q_2$, $Q_3$ or $Q_4$) in relation to educator signals E ($E_1$, $E_2$, $E_3$ or $E_4$) and F ($F_1$, $F_2$, $F_3$ or $F_4$) outputted from the corresponding column of the second synapse array SA2 and supplying the same to the corresponding column of the first synapse array SA1. Referring to FIG. 8E, the signal J from the first synapse array SA1 is supplied to positive-side input ends of differential amplifiers $11a$ and $11b$ and a negative-side input end of a differential amplifier $11c$. The differential amplifier $11a$ receives reference voltage VrefM in its negative-side input end and the differential amplifier $11b$ receives reference voltage VrefL in its negative-side input end, while the differential amplifier $11c$ receives reference voltage VrefH in its positive-side input end respectively. Output from the differential amplifier $11a$ is supplied to the corresponding column of the second synapse array SA2 as the intermediate stage associated corresponding signal Y. Outputs from the differential amplifiers $11b$ and $11c$ are supplied to an AND gate 12. Output from the AND gate 12 is supplied to first input ends of AND gates 13 and 14. On the other hand, the signals E and F from the second synapse array SA2 are supplied to a positive-side input end and a negative-side input end of a differential amplifier 15 respectively. Output from the differential amplifier 15 is supplied to a second input end of the AND gate 14, while being inverted by an inverter 16 to be supplied to a second input end of the AND gate 13. Outputs from the AND gates 13 and 14 are supplied to the corresponding column of the first synapse array SA1 as the signals P and Q, respectively.

Figure 8F:
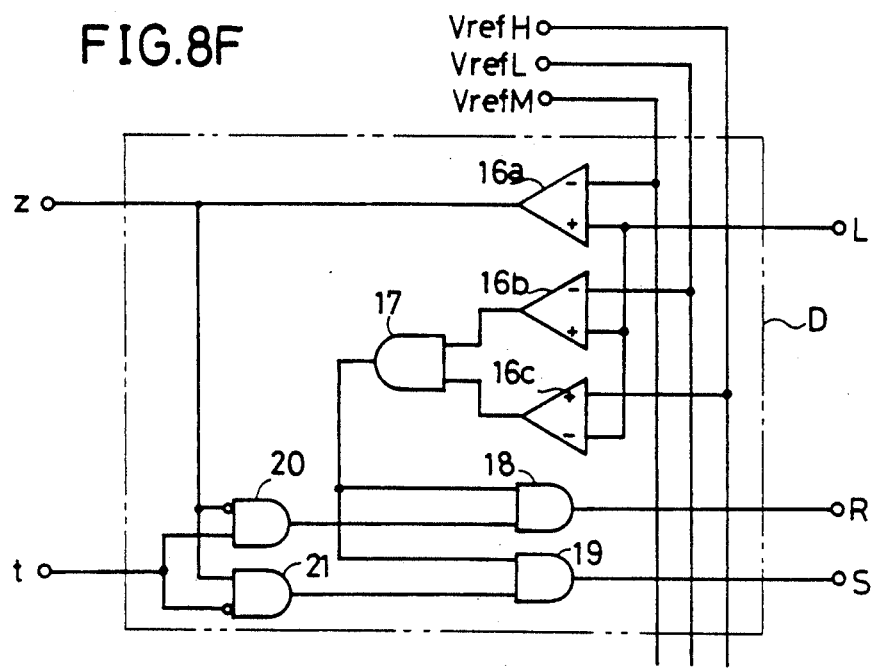
FIG. 8F illustrates the structure of an output stage circuit D shown in FIG. 8A.

FIG. 8F illustrates the structure of each output stage circuit D. The output stage circuits $D_1$ to $D_4$ shown in FIG. 8A are identical in structure to the output stage circuit D shown in FIG. 8F. This output stage circuit D has a function of producing a final stage associated corresponding signal z ($z_1$, $z_2$, $z_3$ or $z_4$) on the basis of a signal L ($L_1$, $L_2$, $L_3$ or $L_4$) outputted from a corresponding row of the second synapse array SA2, and a function of producing signals R ($R_1$, $R_2$, $R_3$ or $R_4$) and S ($S_1$, $S_2$, $S_3$ or $S_4$) through the associated corresponding signal z and an educator signal t ($t_1$, $t_2$, $t_3$ or $t_4$) and supplying the same to the corresponding row of the second synapse array SA2. Referring to FIG. 8F, the signal L from the second synapse array SA2 is supplied to positive-side input ends of differential amplifiers 16a and 16b, and a negative-side input end of a differential amplifier 16c. The differential amplifier 16a receives reference voltage VrefM in its negative-side input end and the differential amplifier 16b receives reference voltage VrefL in its negative-side input end, while the differential amplifier 16c receives reference voltage VrefH in its positive-side input end respectively. Output of the differential amplifier 16a is outwardly derived as the final stage associated corresponding signal z. Outputs from the differential amplifiers 16b and 16c are supplied to an AND gate 17. Output from the AND gate 17 is supplied to first input ends of AND gates 18 and 19. The educator signal t is supplied to a first input end of an AND gate 20. An inverted signal of the educator signal t is supplied to a first input end of an AND gate 21. An inverted signal of the associated corresponding signal z is supplied to a second input end of the AND gate 20. The associated corresponding signal z is supplied to a second input end of the AND gate 21. Outputs from the AND gates 20 and 21 are supplied to second input ends of the AND gates 18 and 19 respectively. Outputs from the AND gates 18 and 19 are supplied to the corresponding row of the second synapse array SA2 as the signals R and S, respectively.

The principle of the learning operation in the embodiment shown in FIGS. 8A to 8F is now described. Similarly to the embodiment shown in FIG. 4A, the learning operation in this embodiment is performed by changing the degrees of coupling of the respective synapses by the steepest descent method, in order to reduce errors between the associated corresponding signals $z_1$ to $z_4$ and the educator signals $t_1$ to $t_4$. In the following description, the degree of coupling of the variable connector element 5 in the unit circuit $A_{ij}$ shown in FIG. 8B is expressed as $u_{ij}$, and the degree of coupling of each of the variable connector elements $5\alpha$, $5\beta$ and $5\gamma$ in the unit circuit $b_{ij}$ shown in FIG. 8C is expressed as $w_{ij}$.

According to the steepest descent method employed in the embodiment shown in FIGS. 8A to 8F, the degrees $u_{ij}$ and $w_{ij}$ of coupling are respectively changed by:

an amount $\Delta u_{ij}$ being proportional to $$-\frac{\partial E}{\partial u_{ij}};$$

and
an amount $\Delta w_{ij}$ being proportional to $$-\frac{\partial E}{\partial w_{ij}}$$

when an error E is equal to $$\frac{1}{2} \sum_l (z_l - t_l)^2,$$

thereby to optimize the degrees $u_{ij}$ and $w_{ij}$ of coupling.

Assuming that $x_j$ is inputted, intermediate stage output $Y_i$ goes to $$f\left(\sum_j u_{ij} x_j\right).$$

where f represents the transfer function of the differential amplifier 11a. Assuming that the intermediate stage output $Y_i$ serves as input $Y_j$, final stage output $z_i$ goes to $$g\left(\sum_j w_{ij} Y_j\right).$$

where g represents the transfer function of the amplifier 16a.

Assuming that $$E = \frac{1}{2} \sum_l (z_l - t_l)^2$$

as hereinabove described, $\Delta w_{ij}$ and $\Delta u_{ij}$ go to:

$$\Delta w_{ij} \alpha - \frac{\partial E}{\partial w_{ij}} = -\sum_k \frac{\partial E}{\partial Z_k} \frac{\partial Z_k}{\partial w_{ij}} = -(z_i - t_i) \cdot g'_i \cdot Y_j$$

$$\Delta u_{ij} \alpha -$$

$$\frac{\partial E}{\partial u_{ij}} = -\sum_k \frac{\partial E}{\partial Y_k} \frac{\partial Y_k}{\partial u_{ij}} = -\sum_l (z_l - t_l) \cdot w_{li} \cdot x_j \cdot g'_l \cdot f'_i$$

where $$g'_i = \frac{dg(L)}{dL} = \frac{d}{dL} g\left(\sum_j w_{ij} Y_j\right); \text{ and}$$

$$f'_i = \frac{df(J)}{dJ} = \frac{d}{dJ} f\left(\sum_j u_{ij} x_j\right)$$

Figure 9:
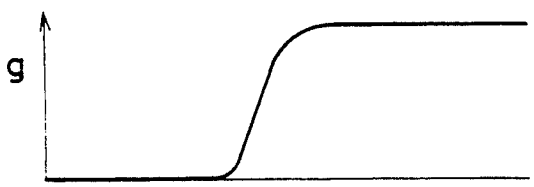
FIG. 9 is a graph showing a transfer function of an amplifier 16a shown in FIG. 8F.
Figure 9:
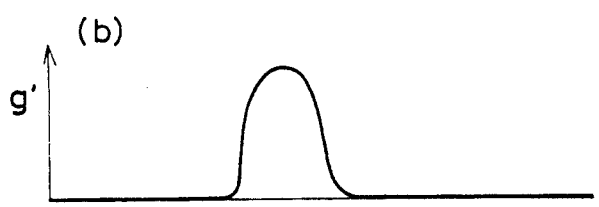
Figure 9:
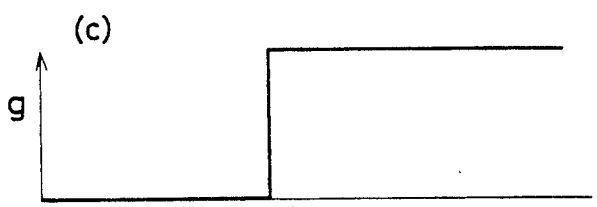
Figure 9:
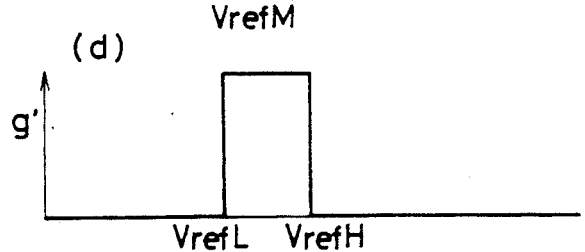

Hence, the degree $w_{ij}$ of coupling is learned by decreasing the degree $w_{ij}$ of coupling when $z_i$="H", $t_i$="L", $Y_i$="H" and $g'_i \neq 0$, and increasing the degree $w_{ij}$ of coupling when $z_i$="L", $t_i$="H", $Y_i$="H" and $g'_i \neq 0$. The transfer functions g and g', which are essentially at values (a) and (b) in FIG. 9, have been approximated to values (c) and (d) in FIG. 9. Therefore, the value g' is nonzero only when the value of $$L_i = \sum_j w_{ij} Y_j$$

is greater than VrefL and less than VrefH.

As to learning of the degree $u_{ij}$ of coupling, it is necessary to obtain $$\sum_l (z_l - t_l) w_{li} g'_l.$$

while negative values cannot be used in an IC chip. Therefore, $$\sum_l w_{li}$$

(referred to as E) with respect to 1 for g'l≠0 and zl −tl>0 and $$\sum_l w_{li}$$

(referred to as F) with respect to 1 for g'l≠0 and zl−tl<0 are obtained, thereby to effect learning by decreasing the degree $u_{ij}$ of coupling when E<F, f'$_i$≠0 and $x_j$="H" and increasing the degree $u_{ij}$ of coupling when E<F, f'$_i$≠0 and $x_j$="H". Through approximation similar to that in the case of g', the value of f' is nonzero only when the value of $J_i = \Sigma u_{ij}$ is greater than VrefL and less than VrefH.

The operation of the embodiment shown in FIGS. 8A to 8F is now described. Before the learning operation, the counter circuit 4 is reset by a rest signal $\phi_R$ in each of the unit circuits A and B of the first and second synapse circuits SA1 and SA2. Then the differential amplifier 11a outputs $$Y_i = f(J_i) = f\left(\sum_j u_{ij}x_j\right)$$

in response to an input signal $x_j$. Further, the differential amplifier 16a outputs $$z_i = g(L_i) = g\left(\sum_j w_{ij}Y_j\right).$$

The output of the AND gate 12 in the intermediate stage circuit C goes high only when the value of $$J_i = \sum_j u_{ij}x_j$$

is greater than VrefL and less than VrefH, to indicate that f'$_i$ is nonzero. On the other hand, the output of the AND gate 17 in the output stage circuit D goes high only when the value of $$L_i = \sum_j w_{ij}Y_j$$

is greater than VrefL and less than VrefH, to indicate that g'$_i$ is nonzero.

The output $R_i$ of the AND gate 18 goes high only when $z_i$="L", $t_i$="H" and the output of the AND gate 17 is high. Then output $S_i$ of the AND gate 19 goes high only when $z_i$="H", $t_i$="L" and the output of the AND gate 17 is high.

Output INC$_{ij}$ of the AND gate 2 in the unit circuit $B_{ij}$ goes high only when $Y_j$="H" and $R_i$="H". Output DEC$_{ij}$ of the AND gate 3 in the unit circuit $B_{ij}$ goes high only when $Y_j$="H" and $S_i$="H". The degree $w_{ij}$ of coupling of each of the variable connector elements 5α to 5γ of the synapse circuit 100 is increased when INC$_{ij}$="H" and decreased when DEC$_{ij}$="H". That is, when a clock signal $\phi_1$ is high, the counter circuit 4 is counted up if INC$_{ij}$="H" and counted down if DEC$_{ij}$="H", thereby to vary the degree $w_{ij}$ of coupling of each of the variable connector elements 5α to 5γ with the output of the counter circuit 4. The degrees $w_{ij}$ of coupling of the variable connector elements 5α to 5γ are set at the same value. Thus, the degree $w_{ij}$ of coupling is adjusted once.

Then, $u_{ij}$ is adjusted. As hereinabove described, $R_i$ goes high when $z_i$="L", $t_i$="H" and g'$_i$≠0, and $S_i$ goes high when $z_i$="H", $t_i$="L" and g'$_i$≠0. The variable connector element 5γ shown in FIG. 8C incorporates $S_i$, to generate $$E_j = \sum_i w_{ij}S_ig_i.$$

The variable connector element 5 incorporates $R_i$ to generate $$F_j = \sum_i w_{ij}R_ig_i.$$

$E_j$ and $F_j$ are inputted in the differential amplifier 15, which in turn outputs "H" when $E_j > F_j$, while outputting "L" when $E_j < F_j$. Therefore, the output $P_i$ of the AND gate 13 goes high only when $E_j < F_j$ and F'$_i$≠0. The output $Q_i$ of the AND gate 14 goes high only when $E_j > F_j$ and F'$_i$≠0. The output INC$_{ij}$ of the AND gate 2 in the unit circuit $A_{ij}$ goes high only when $x_j$="H" and $P_i$="H". The output DEC$_{ij}$ of the AND gate 3 in the unit circuit $A_{ij}$ goes high only when $x_j$="H" and $Q_i$="H". The degree $u_{ij}$ of coupling of the variable connector element 5 in the synapse circuit 1 is increased when INC$_{ij}$="H", and decreased when DEC$_{ij}$="H". That is, when the clock signal $\phi_1$ is high, the counter circuit 4 is counted up if INC$_i$="H" and counted down if DEC$_{ij}$="H", thereby to vary the degree $u_{ij}$ of coupling of the variable connector element 5 with the output of the counter circuit 4. Thus, $u_{ij}$ is adjusted once.

The degree $w_{ij}$ and $u_{ij}$ of coupling are repeatedly adjusted in the aforementioned manner, to advance learning.

Associative operation is now described. Assuming that an input signal $x_j$ is supplied after the learning operation, the differential amplifier 11a outputs $$y_i = f\left(\sum_j u_{ij}x_j\right).$$

and the differential amplifier 16a outputs $$z_i = g\left(\sum_j w_{ij}y_j\right).$$

this value $z_i$ serves as associative output with respect to the input $x_j$, i.e., an associated corresponding signal.

Now, consider the case of implementing an exclusive OR circuit through the inventive neural network. It is well known that logical relation between inputs $x_1$ and $x_2$ and output $y_1$ of an exclusive OR circuit is as shown in FIG. 10. In order to implement such an exclusive OR circuit by a one-layer perceptron shown in FIG. 11, the value of a synapse $w_1$ must be at least 0.5 so that $y_1 = 1$ when $(x_1, x_2) = 0$ and $y_1 = 1$ when $(x_1, x_2) = (0,1)$ assuming that the threshold value of a nerve cell 105 is 0.5. Therefore, $y_1 = 1$ when $(x_1, x_2) = (1,1)$. Thus, it is understood that an exclusive OR circuit cannot be implemented by a one-layer perceptron. However, implementation of an exclusive OR circuit is enabled by a two-layer perceptron shown in FIG. 12. Respective parts of the neural network shown in FIG. 12 are identical in structure to those shown in FIGS. 8B to 8F. However, the neural network shown in FIG. 12, which has two inputs ($x_1$ and $x_2$) and one output ($z_1$), is scaled down as compared with the neural network shown in FIG. 8A.

The neural network shown in FIG. 12 was employed to perform simulation for learning relation between inputs and output of an exclusive OR circuit, assuming that $+V$ in FIG. 8D was 5 V, ON resistance of the transistors $51a$ to $51j$ in FIG. 8D was three times the resistance value of resistors $9_1$ and $9_2$ shown in FIG. 12, VrefH=1.3 V, VrefM =0.8 V, VrefL=0.3 V, initial values of counters in unit circuits $A_{11}$, $A_{21}$, $A_{12}$ and $A_{22}$ were 3, 0, 0 and 3 respectively, and those of counters in unit circuits $B_{11}$ and $B_{12}$ were 0 and 0 respectively. While all initial values of the counters in the output layer were zero similarly to the case of the one-layer perceptron, those of the counters in the intermediate layer must not be all zero. If all counters of the intermediate layer are at zero, output ($y_1$, $y_2$) goes to (0, 0) whether ($x_1$, $x_2$)=(0, 0), (0, 1), (1, 0) or (1, 1), and hence it is necessary to make both of $Z=0$ and $Z=1$ correspond to ($y_1$, $y_2$) =(0, 0) in learning of the output layer. However, this is impossible to learn. Learning was made through procedure shown in FIG. 13. In the procedure shown in FIG. 13, learning of an intermediate layer $u_{ij}$ is made only when the loop count of the learning operation is a multiple of three. Learning of degrees u and w of coupling is made by a method identical to that in the neural network shown in FIG. 8A.

Figure 13:
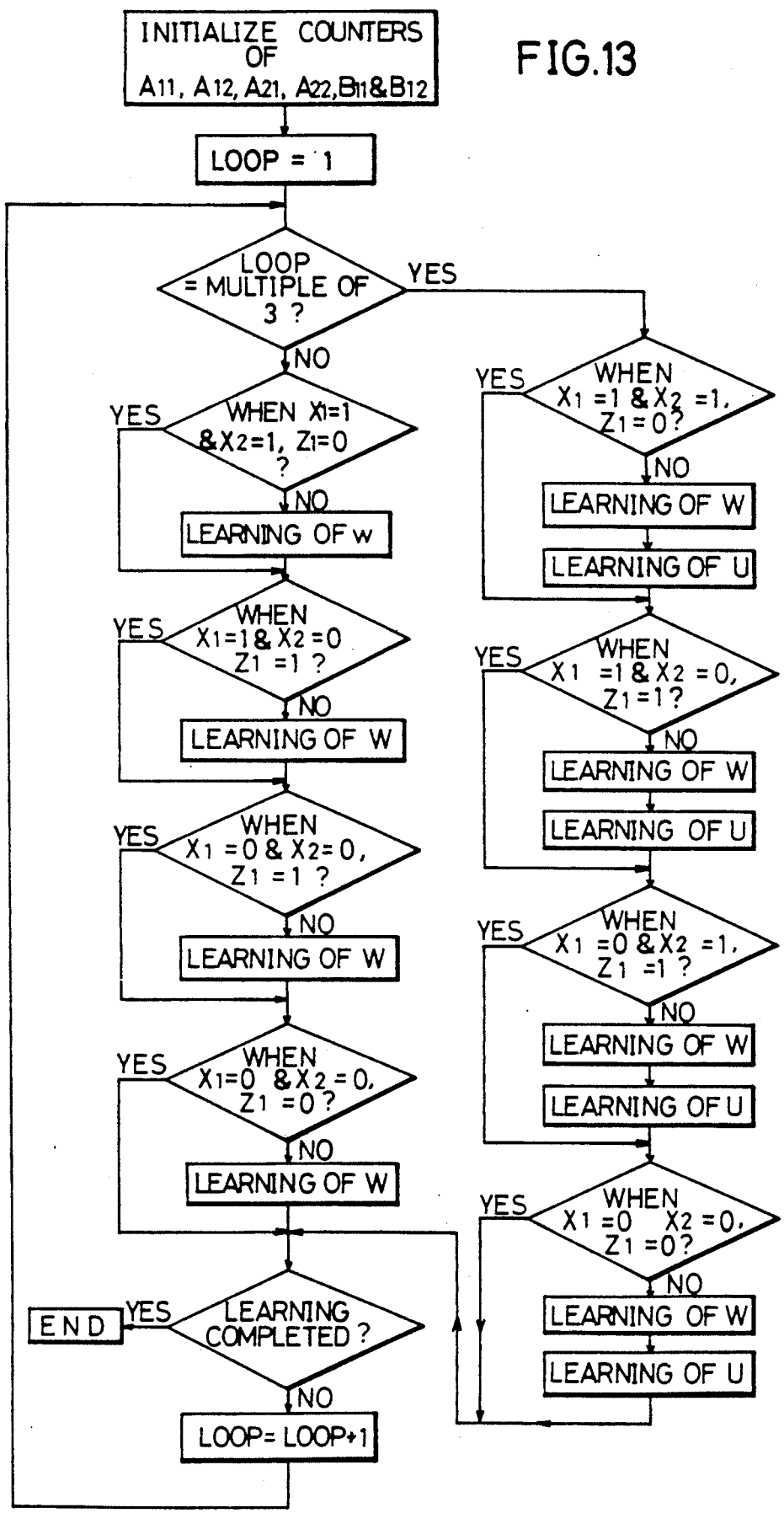
FIG. 13 is a flow chart showing the procedure of simulation for learning of the neural network shown in FIG. 12.

In the procedure shown in FIG. 13, the values of the unit circuits $A_{11}$, $A_{12}$, $A_{21}$, $A_{22}$, $B_{11}$ and $B_{12}$ became 3, $-3$, $-3$, 3, 2 and 2 when the loop count was 10, thereby to complete the learning. Thus, the two-layer perceptron shown in FIG. 12 can implement a function which cannot be implemented by a one-layer perceptron.

Although the variable connector elements are formed by transistors in the aforementioned embodiments, the same may be prepared by EEPROM elements. While the process for manufacturing an IC is complicated in this case, the chip area can be reduced since the number of elements is reduced.

Figure 14A:
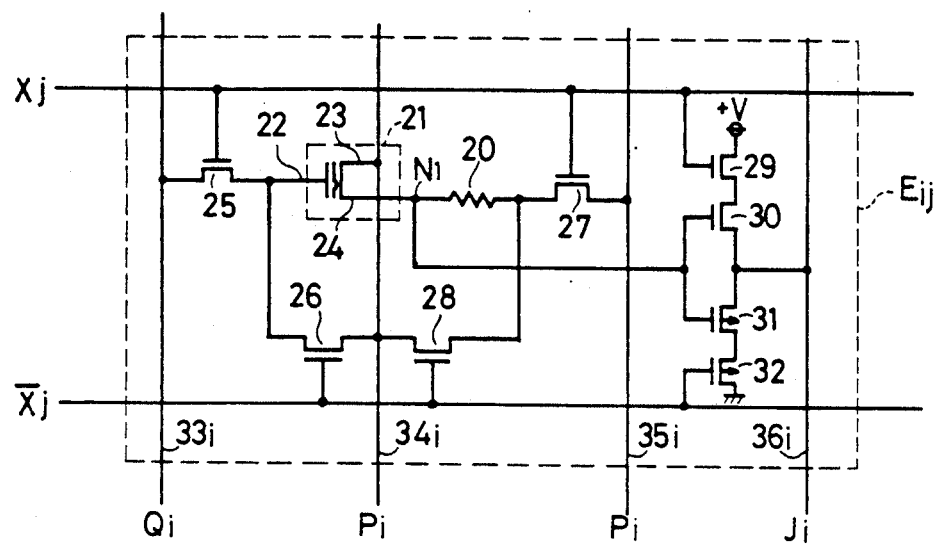
FIG. 14A is a circuit diagram showing an exemplary unit circuit formed through an EEPROM element.

FIG. 14A is a circuit diagram showing an exemplary unit circuit $E_{ij}$ which is formed by employing an EEPROM element. Referring to FIG. 14A, the unit circuit $E_{ij}$ includes a MOS transistor 21 having a floating gate as an EEPROM element. A control gate 22 of this transistor 21 is connected to a signal line $33_i$ (supplied with a signal $Q_i$) through a transistor 25, as well as to a signal line $34_i$ (supplied with a signal $P_i$) through a transistor 26. A source 23 of the transistor 21 is connected to the signal line $34_i$. A drain 24 of the transistor 21 is connected to an end of a resistor 20, as well as to respective gates of transistors 30 and 31. Another end of the resistor 20 is connected to a signal line $35_i$ (deriving a signal $P'_i$) through a transistor 27, as well as to the signal line $34_i$ through a transistor 28. The transistors 30 and 31 are connected in series with each other, so that the common node thereof is connected to a signal line $36_i$ (deriving a signal $J_i$). A transistor 29 is interposed between the transistor 30 and a power source ($+V$). A transistor 32 is interposed between the transistor 31 and the ground. An input signal $x_j$ is supplied to respective gates of the transistors 25, 27 and 29. An inverted signal $\bar{x}_j$ of the input signal $x_j$ is supplied to respective gates of the transistors 26, 28 and 32. The transistors 25 to 30 are N-channel MOS transistors, and the transistors 31 and 32 are P-channel transistors.

Figure 14B:
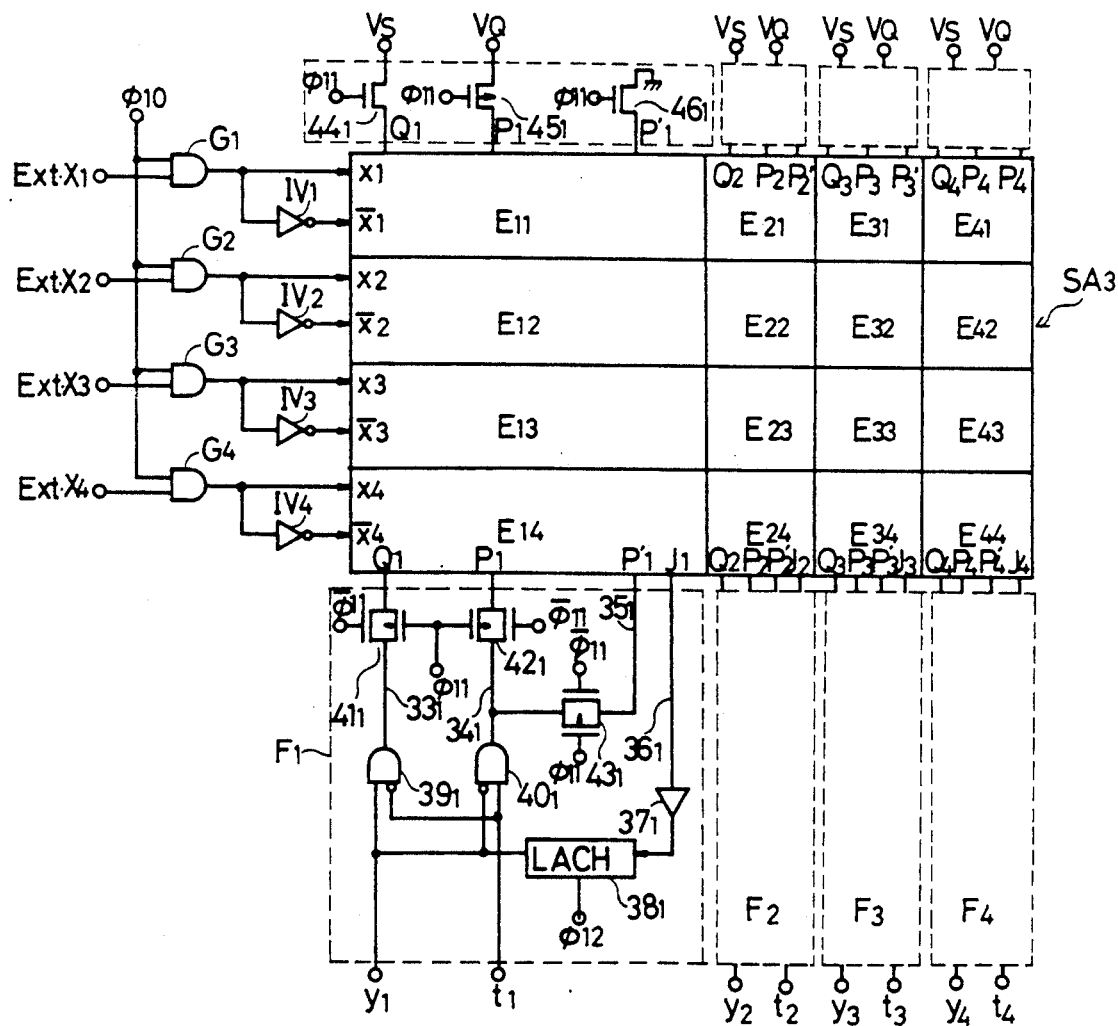
FIG. 14B illustrates the structure of a neural network according to a third embodiment of the present invention, which is formed through the unit circuit shown in FIG. 14A.

FIG. 14B illustrates the structure of a neural network formed by such unit circuits shown in FIG. 14A. This neural network implements a one-layer perceptron which outputs associated corresponding signals $y_1$ to $y_4$ with respect to external input signals Ext·$x_i$ to Ext·$x_4$ in hardware. Referring to FIG. 14B, a plurality of unit circuits $E_{11}$ to $E_{44}$ shown in FIG. 14A are arranged to form a synapse array SA3. AND gates $G_1$ to $G_4$ are provided in correspondence to respective rows of the synapse array SA3. The external input signals Ext·$x_1$ to Ext·$x_4$ are supplied to first input ends of the AND gates $G_1$ to $G_4$. A control signal $\phi_{10}$ is supplied to second input ends of the AND gates $G_1$ to $G_4$. Outputs from the AND gates $G_1$ to $G_4$ are supplied to corresponding rows of the synapse array SA3 as input signals $x_1$ to $x_4$ respectively. Further, the outputs of the AND gates $G_1$ to $G_4$ are supplied to the corresponding rows of the synapse array SA3 as inverted input signals $\bar{x}_1$ $\bar{x}_4$ through inverters $IV_1$ to $IV_4$ respectively.

Output stage circuits $F_1$ to $F_4$ are provided on an output side of the synapse array SA3 in correspondence to the respective columns. The output stage circuits $F_1$ to $F_4$ are identical in circuit structure to each other, while FIG. 14B shows only the circuit structure of the output stage circuit $F_1$, for simplifying the illustration. In the output stage circuit $F_1$, a signal line $36_1$ is connected to an input end of an amplifier $37_1$. Output of the amplifier $37_1$ is supplied to an input end of a latch circuit $38_1$. Latch operation of the latch circuit $38_1$ is controlled by a control signal $\phi_{12}$. Output of the latch circuit $38_1$ is outwardly derived as an output signal $y_1$. Further, the output of the latch circuit $38_1$ is supplied to a first input end of an AND gate $39_1$, while being inverted and supplied to a first input end of an AND gate $40_1$. An educator signal $t_1$ is inverted and supplied to a second input end of the AND gate $39_1$, while the educator signal $t_1$ is directly supplied to a second input end of the AND gate $40_1$. Outputs of the AND gates $39_1$ and $40_1$ are derived on signal lines $33_1$ and $34_1$ respectively. Transistor switches $41_1$ and $42_1$ are interposed in the signal lines $33_1$ and $34_1$ respectively. A transistor switch $43_1$ is interposed between signal lines $34_1$ and $35_1$. Each of the transistor switches $41_1$ to $43_1$ is formed by connecting a P-channel MOS transistor and an N-channel MOS transistor in parallel with each other. The parallel-connected P-channel and N-channel MOS transistors are on-off controlled by control signals $\phi_{11}$ and $\bar{\phi}_{11}$ which are complementary to each other.

In the neural network shown in FIG. 14B, further, voltage $V_S$ is supplied to the signal line $33_1$ through an N-channel MOS transistor $44_1$ and voltage $V_Q$ is supplied to the signal line $34_1$ through a P-channel MOS transistor $45_1$, while the signal line $35_1$ is grounded through an N-channel MOS transistor $46_1$. The control signal $\phi_{11}$ controls conduction/nonconduction of the transistors $44_1$ and $46_1$, and the control signal $\bar{\phi}_{11}$ controls conduction/nonconduction of the transistors $45_1$. Other columns of the synapse array SA3 are structured similarly to the above.

Figure 14C:
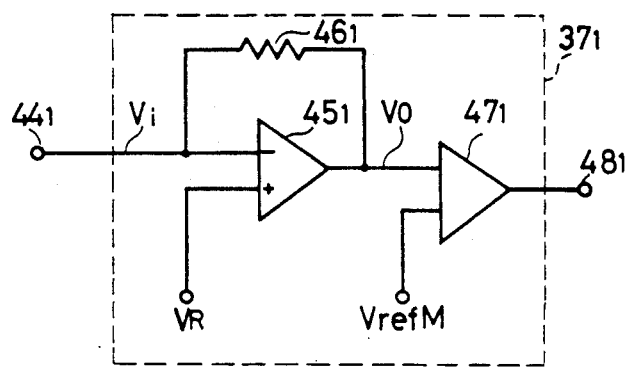
FIG. 14C is a circuit diagram showing exemplary structure of an amplifier $37_1$ shown in FIG. 14B.

FIG. 14C illustrates exemplary circuit structure of the amplifier $37_1$ shown in FIG. 14B. Referring to FIG. 14C, an input terminal $44_1$ is connected to a minus-side input end of a differential amplifier $45_1$, as well as to an output end of the differential amplifier $45_1$ through a resistor $46_1$. Voltage $V_R$ is applied to a plus-side input end of the differential amplifier $45_1$. The output end of the differential amplifier $45_1$ is connected to a minus-side input end of a differential amplifier $47_1$. Voltage VrefM is applied to a plus-side input end of the differential amplifier $47_1$. An output end of the differential amplifier $47_1$ is connected to an output terminal $48_1$. Relation between input voltage $V_i$ and output voltage $V_o$ of the differential amplifier $45_i$ $V_o \simeq V_R - IR$ and $V_i \simeq V_R$ assuming that $V_o - V_R = -G(V_i - V_R)$, where $-G$ represents the gain of the differential amplifier $45_1$, and I represents current flowing into the input terminal $44_1$ of the differential amplifier $45_1$, when $-G$ has a large absolute value. When the current I flowing into the input terminal $44_1$ is large and $V_o$ is less than VrefM, the output of the differential amplifier $47_i$ goes high. When the current I flowing into the input terminal $V_i$ is small and $V_o$ is less than VrefM, the output of the differential amplifier $47_1$ goes low. Thus, the function of the differential amplifier $47_1$ shown in FIG. 14B is similar to that of the amplifier $6_1$ shown in FIG. 4A.

Assuming that the input signal $x_j$ is high, the signal $Q_i$ is $V_s$, the signal $P_i$ is $V_Q$ and $P'_i$ is 0 V in the structure shown in IFGS. 14A to 14C, large current flows from the signal line $34_i$ to the resistor 20 when the transistor 21 has a low threshold value, whereby the potential at a node N1 exceeds $V_r + V_{THN}$, where $V_{THN}$ represents the threshold voltage of the N-channel MOS transistor. Since the potential of the signal line $36_i$ is maintained at $V_R$ through the amplifier $37_i$ as hereinabove described, the transistor 30 conducts and current flows from the power source $+V$ to the signal line $36_i$. When the transistor 21 has a high threshold value on the other hand, current flowing from the signal line $34_i$ into the resistor 20 is small and hence the potential of the node N1 is less than $V_R - |V_{THP}|$, where $V_{THP}$ represents threshold voltage of the P-channel MOS transistor. Since the potential of the signal line $36_i$ is at $V_R$, the P-channel transistor 31 conducts. Therefore, current flows from the signal line $36_i$ to the ground through the transistors 31 and 32. Thus, the synapse is stimulative when the transistor 21 has a low threshold value, while the same is inhibitory when the transistor 21 has a high threshold value.

Figure 15:
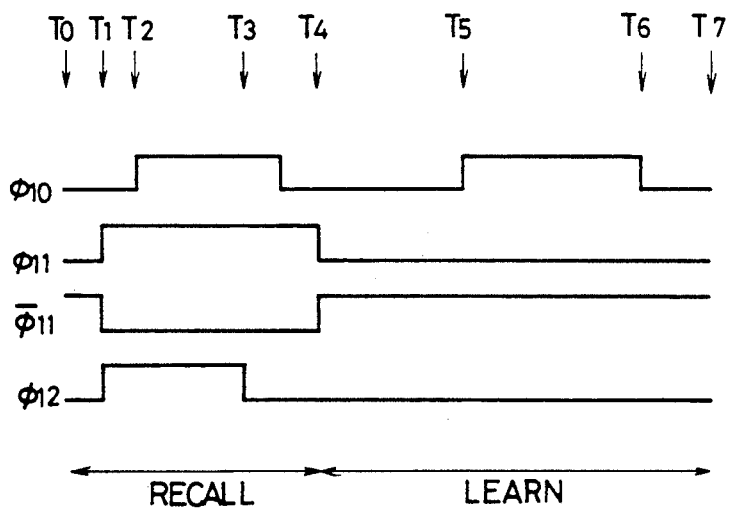
FIG. 15 is a timing chart for illustrating the operation of the embodiment shown in FIG. 14B.

FIG. 15 is a timing chart for illustrating the operation of the embodiment shown in FIGS. 14A to 14C. With reference to FIG. 15, the operation of the embodiment shown in FIGS. 14A to 14C is now described.

Associative operation is first described. The control signal $\phi_{11}$ goes high and $\overline{\phi}_{11}$ goes low at a time $T_1$, whereby the transistors $44_i$, $45_i$ and $46_i$ conduct and the transistor switches $41_1$, $42_1$ and $43_1$ enter nonconducting states. Therefore, positive voltage $V_Q$ is applied to the signal line $34_i$ and reference potential $V_s$ is applied to the signal line $33_i$, while ground potential 0 V is applied to the signal line $35_i$. Then, the control signal $\phi_{10}$ goes high at a time $T_2$, whereby $x_i$ goes high and $\overline{x}_i$ goes low if the external input signal Ext·$x_i$ is high, while $x_i$ goes low and $\overline{x}_i$ goes high if Ext·$x_i$ is low. When the transistor 21 of a unit circuit $E_{ij}$ receiving a high input signal $x_i$ has a low threshold value, current flows into the signal line $36_i$. When the transistor 21 has a high threshold value, on the other hand, current flows out from the signal line $36_i$. When deduction between the current flowing into the signal line $36_i$ from each unit circuit $E_{ij}$ and that flowing out is greater than a constant amount, the output of the amplifier $37_i$ goes high, while the same goes low when the deduction is less than the constant amount. The control signal $\phi_{12}$ goes low at a time $T_3$, and the latch circuit $38_i$ stores the value of the current output $y_i$.

Learning operation is now described. In the learning operation, the external input signals Ext·$x_4$ as well as educator signals $t_1$ to $t_4$ are supplied. If the value of an output $y_i$ is different from that of an educator signal $t_i$, learning must be made by changing the threshold value of the EEPROM element, i.e., the transistor 21. If the output $y_i$ is high when the educator signal $t_i$ is low, outputs of AND gates $39_i$ and $40_i$ go high and low respectively. When $\phi_{11}$ goes low $\overline{\phi}_{11}$ goes high at a time $T_4$, transistors $44_i$, $45_i$ and $46_i$ enter nonconducting states and transistor switches $41_i$, $42_i$ and $43_i$ enter conducting states. Hence, the signal $Q_i$ goes high and the signals $P_i$ and $P'_i$ go low. Then, the control signal $\phi_{10}$ goes high at a time $T_5$, whereby $x_j$ goes high and $\overline{x}_j$ goes high only when an external input signal Ext·$x_j$ is high, and the transistors 26 and 28 in FIG. 14A enter nonconducting states and the transistors 25 and 27 enter conducting states. Thus, the control gate 23 and the drain 24 go low. Therefore, electrons are injected into the floating gate of the transistor 21 from the source 23 and the drain 24 through a tunnel phenomenon, whereby the threshold value of the transistor 21 is increased and the degree of synapse coupling is reduced.

If the output $y_i$ is low when the educator signal $t_i$ is high, outputs of the AND gates $39_i$ and $40_i$ go low and high respectively. $\phi_{11}$ goes low and $\overline{\phi}_{11}$ goes high at the time $T_4$, whereby the transistors $44_i$, $45_i$ and $46_i$ enter nonconducting states and the transistor switches $41_i$, $42_i$ and $43_i$ enter conducting states. Therefore, the signal $Q_i$ goes low and the signals $P_i$ and $P'_i$ go high. Then, the control signal $\phi_{10}$ goes high at the time $T_5$, whereby $x_j$ goes high and $\overline{x}_j$ goes low only when the external input signal Ext·$x_j$ is high, and the control gate 22 of the transistor 21 goes low and the source 23 and the drain 24 go high. Therefore, electrons are emitted from the floating gate of the transistor 21 to the source 23 and the drain 24 by a tunnel phenomenon, whereby the threshold value of the transistor 42 is lowered and the degree of synapse coupling is increased.

If learning is not completed through the learning operation between the times $T_4$ and $T_7$, the associative operation between the times $T_1$ and $T_3$ and the learning operation between the times $T_4$ and $T_7$ are repeated.

Variation in the threshold value of the transistor 21 caused by single learning can be adjusted by changing the values of voltage applied to the control gate and that applied across the source and the drain, the length of the time ($T_5$ to $T_6$) for applying the voltage, and the like.

As hereinabove described, the embodiment shown in FIGS. 14A to 14C can perform associative operation and learning operation similarly to the embodiment shown in FIG. 4A.

Also as to the two-layer perceptron shown in FIG. 8A, each unit circuit can be formed by employing an EEPROM element, as a matter of course.

Although the present invention has been described and illustrated in detail, it is clearly understood that the same is by way of illustration and example only and is not to be taken by way of limitation. the spirit and scope of the present invention being limited only by the terms of the appended claims.

What is claimed is:

1. A neural network comprising:

a plurality of synapse circuits, each synapse circuit having an input, an output and adjustable coupling means for changing the degree of electrical coupling between the input and output;

a plurality of signal input terminals respectively connected to inputs of said synapse circuits for supplying logic signals to respective synapse circuits;

signal conversion means commonly connected to the outputs of said synapse circuits for integrating collective analog output signals of said synapse circuits and, with reference to a predetermined threshold, generating an associated binary signal;

control signal generating means for generating coupling control signals in response to an error between an externally applied reference educator signal and said binary signal, said control signal generating means comprising first logic means for reducing the degree of coupling of said synapse circuits when said error is of positive polarity and second logic means for increasing the degree of coupling of said synapse circuits when said error is of negative polarity; and a plurality of gate means individually provided between the adjustable coupling means of each synapse circuit and said control signal generating means for applying said coupling control signals to said adjustable coupling means in response to corresponding logic signals applied to the input terminals of the synapse circuits.

2. A neural network in accordance with claim 1, wherein
said adjustable coupling means comprises means to change the synapse circuit output voltage in response to said coupling control signal when a logic signal applied to said signal input terminal is in a first logic state.

3. A neural network in accordance with claim 1, wherein
said adjustable coupling means comprises:
a plurality of transistors for varying impedance, being connected in parallel with each other and having first ends connected to an output of said synapse circuit,
a power supply for introducing a reference voltage,
switching means interposed between respective second ends of said plurality of transistors and said power supply line to perform on-off operation in response to a logic signal applied to the corresponding signal input terminal, and
counter means performing a counting operation in response to a control signal received from a corresponding one of said plurality of gate means for selectively causing conduction of said transistors for varying coupling impedance of the synapse circuit.

4. A neural network in accordance with claim 3, wherein
said power supply is provided with a first power supply line for introducing a first reference voltage for a stimulative signal and a second power supply line for introducing a second reference voltage for an inhibitory signal, said plurality of transistors for varying coupling impedance and said switching means being responsively provided in pairs respectively.

5. A neural network in accordance with claim 3, wherein
said counter means includes:

a shift register having unit registers of the same number as said transistors for varying impedance, and
a control circuit for controlling a shifting operation of said shift register in response to said control signal.

6. A neural network in accordance with claim 5, wherein
said control circuit controls the number of logic data introduced into said shift register and shifting operation thereof.

7. A neural network in accordance with claim 1, wherein
said signal conversion means comprises a threshold amplifier.

8. A neural network in accordance with claim 1, wherein
said control signal generating means generates two control signals, to express three states representing an increase coupling command, a decrease coupling command and a maintain coupling command for setting said degree of electrical coupling of said synapse circuits by logic combinations of said two control signals.

9. A neural network in accordance with claim 1, wherein
said plurality of said synapse circuits and said plurality of said gate means are provided in a matrix array with respective rows connected to said signal input terminals,
and wherein respective columns of said matrix array are connected to a plurality of said signal conversion means, a plurality of said educator signal input means and a plurality of said control signal generating means.

10. A neural network in accordance with claim 1, wherein
each said synapse circuit includes a non-volatile semiconductor memory device.

11. A multiple neural network comprising:
a plurality of signal input terminals for inputting a plurality of logic signals;
a first neural circuit receiving said plurality of logic signals from said plurality of signal input terminals for outputting a plurality of intermediate stage signals, said first neural circuit comprising:
(a) a first synapse array comprising a plurality of synapse circuits, each synapse circuit having an input, an output and adjustable coupling means for changing the degree of electrical coupling between the input and output, and
(b) a plurality of first signal conversion means connected to respective columns of said first synapse array for integrating collective analog output signals of said synapse circuits connected thereto and, with reference to a predetermined threshold, generating intermediate stage binary signals; and
a second neural circuit receiving said plurality of intermediate stage signals outputted from said first neural circuit as input signals, for outputting at least one associated corresponding signal, said second neural circuit comprising:
(c) a plurality of second synapse circuits for receiving respective outputs from said plurality of first signal conversion means, each of said second synapse circuits having an input, an output and adjustable coupling means for changing the degree of electrical coupling between the input and output, and (d) second signal conversion means commonly connected to respective outputs of said second synapse circuits for integrating collective analog output signals of said second synapse circuits connected thereto and, with reference to a predetermined threshold, generating associated binary signals;

first learning means for adjusting the degree of electrical coupling of said first neural circuit; and second learning means for adjusting the degree of electrical coupling of said second neural circuit.

12. A neural network in accordance with claim 11, wherein said second neural circuit comprises:

(a) a second array of synapse circuits, each synapse circuit of said second array including input terminals coupled to receive said first control signal and output terminals and a plurality of variable connector elements for changing the degree of electrical coupling between an input terminal and an output terminal, and (b) a plurality of second gate means connected to corresponding ones of said first synapse circuits for performing switching operation in response to logic signals at said signal input terminals; and said first learning means comprises:

a plurality of second control signal generating means for generating a second control signal for controlling increase, decrease and maintenance of degrees of electrical coupling of said first synapse circuits in corresponding columns on the basis of analog output signals from corresponding ones of said plurality of variable connector elements and said analog output signals from said first neural circuit, said second control signal generating means being connected to corresponding ones of said second gate means.

13. A neural network in accordance with claim 12, wherein said first control signal generating means generates two control signals and a pair of said variable connector elements in each said second synapse circuit operate in response thereto, and said second control signal generating means includes a differential amplifier for comparing levels of two analog signals from a corresponding pair of said variable connector elements.

14. A neural network in accordance with claim 13, wherein said first control signal generating means includes:

first level detecting means for detecting whether or not the levels of said analog signals input to said second signal conversion means are in a prescribed level range, and gate means for controlling output of said first control signal in response to said first level detecting means, and said second control signal generating means includes:

second level detecting means for detecting whether or not the levels of said analog signals input to said first signal conversion means are within a prescribed level range, and gate means for controlling output of said second control signal in response to said second level detecting means.

15. A neural network in accordance with claim 11, wherein said second learning means includes:

means for inputting educator signals for learning;

first control signal generating means for generating a first control signal for controlling increase, decrease and maintenance of degrees of electrical coupling of said second synapse circuits on the basis of said associated binary signals, said analog output signals of said first synapse circuits and said educator signals, and a plurality of first gate means individually provided between said second synapse circuits and said first control signal generating means for applying coupling control signals to said second synapse circuits in response to corresponding ones of said intermediate stage binary signals, whereby said second synapse circuits change degrees of electrical coupling between input and output in response to said first control signal supplied through said first gate means.

16. A neural network in accordance with claim 15, wherein a plurality of said second synapse circuits and a plurality of said first gate means correspond to respective ones of said first signal conversion means, and a plurality of said educator signal input means and a plurality of said first control signal generating means are provided in correspondence thereto.

* * * * *